US012792063B2

(12) United States Patent
Iwazaki et al.

(10) Patent No.: US 12,792,063 B2
(45) Date of Patent: Nov. 10, 2026

(54) VEHICLE MANUFACTURING SYSTEM AND VEHICLE MANUFACTURING METHOD

(71) Applicant: TOYOTA JIDOSHA KABUSHIKI KAISHA, Toyota (JP)

(72) Inventors: Noritsugu Iwazaki, Shizuoka-ken (JP); Takeshi Kanou, Seto (JP); Go Inoue, Gotenba (JP); Yuki Okamoto, Ebina (JP); Kento Ohara, Nisshin (JP); Satoshi Takahashi, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/028,321

(22) Filed: Jan. 17, 2025

(65) Prior Publication Data

US 2025/0284295 A1 Sep. 11, 2025

(30) Foreign Application Priority Data

Mar. 8, 2024 (JP) ................................ 2024-035598

(51) Int. Cl.
*G05D 1/69* (2024.01)
*G05D 1/695* (2024.01)
*G05D 107/70* (2024.01)

(52) U.S. Cl.
CPC ......... *G05D 1/695* (2024.01); *G05D 2107/70* (2024.01)

(58) Field of Classification Search
CPC ............... G05D 1/695; G05D 2107/70; G05D 2111/10; G05D 1/249; G05D 1/65; G05D 1/6987; G05D 2105/45; G05D 2109/10; G05D 1/43; G05D 1/243; G05D 1/648; G05D 2105/20
See application file for complete search history.

(56) References Cited

U.S. PATENT DOCUMENTS

2017/0320529 A1 11/2017 Nordbruch
2018/0082591 A1* 3/2018 Pandy .................. B60W 40/08
2019/0079540 A1 3/2019 Yoon et al.
(Continued)

FOREIGN PATENT DOCUMENTS

JP 2017-538619 A 12/2017
JP 2021-062790 A 4/2021
(Continued)

*Primary Examiner* — Joseph J Dallo
(74) *Attorney, Agent, or Firm* — Sughrue Mion, PLLC

(57) ABSTRACT

A vehicle manufacturing system according to this embodiment is a vehicle manufacturing system for performing control in such a way that a plurality of vehicles forming a platoon travel during a manufacturing process or a transporting process, the vehicle manufacturing system including: a computing unit configured to compute a control instruction value; a sensor provided to detect an inter-vehicle distance; determination unit for determining, based on the inter-vehicle distance, whether or not the platoon is disturbed; a transmitter configured to transmit, in a case where the platoon is not disturbed, a common control instruction value to the plurality of vehicles; a communication apparatus that is provided in the vehicle and receives the control instruction value; and speed control unit for controlling the speed of the vehicle in accordance with the control instruction value.

13 Claims, 11 Drawing Sheets

(56) References Cited

U.S. PATENT DOCUMENTS

| | | | | |
|---|---|---|---|---|
| 2020/0209889 | A1* | 7/2020 | Dev | B60R 1/27 |
| 2020/0380870 | A1* | 12/2020 | Eguchi | G05D 1/0094 |
| 2021/0303001 | A1* | 9/2021 | Xu | G08G 1/22 |
| 2023/0252901 | A1* | 8/2023 | Okuda | B60W 10/10 |
| 2024/0029569 | A1* | 1/2024 | Cho | G08G 1/22 |
| 2024/0077888 | A1* | 3/2024 | Ha | G05D 1/0295 |
| 2024/0152153 | A1* | 5/2024 | Cho | B60W 30/165 |

FOREIGN PATENT DOCUMENTS

| | | | | |
|---|---|---|---|---|
| KR | 10-2301487 | B1 | 9/2021 | |
| WO | WO-2021009051 | A1 * | 1/2021 | B60K 11/085 |
| WO | WO-2022208697 | A1 * | 10/2022 | G08G 1/00 |

* cited by examiner

VEHICLE MANUFACTURING SYSTEM AND VEHICLE MANUFACTURING METHOD

CROSS REFERENCE TO RELATED APPLICATIONS

This application is based upon and claims the benefit of priority from Japanese patent application No. 2024-035598, filed on Mar. 8, 2024, the disclosure of which is incorporated herein in its entirety by reference.

BACKGROUND

The present disclosure relates to a vehicle manufacturing system and a vehicle manufacturing method.

Patent Literature 1 discloses a vehicle manufacturing system. A vehicle travels, by autonomous control or remote control, in a system for producing vehicles.

[Patent Literature 1] Published Japanese Translation of PCT International Publication for Patent Application, No. 2017-538619

SUMMARY

In a vehicle manufacturing factory, a plurality of vehicles are sequentially manufactured. In a case where a plurality of vehicles perform self-propelled transportation, a server or the like transmits control instruction values to the plurality of vehicles as radio signals. If the server individually obtains, for each of the vehicles, control instruction values and transmits these control instruction values to the respective vehicles, a communication load and a processing load increase.

An object of the present disclosure is to provide a vehicle manufacturing system and a vehicle manufacturing method capable of preventing a communication load and a processing load from increasing.

A vehicle manufacturing system according to the present disclosure is a vehicle manufacturing system for performing control in such a way that a plurality of vehicles forming a platoon travel during a manufacturing process or a transporting process, the vehicle manufacturing system including: computation unit for computing a control instruction value for controlling a speed of the vehicle; a sensor provided to detect an inter-vehicle distance, which is a distance between one of the plurality of vehicles and another adjacent one of the plurality of vehicles; determination unit for determining, based on the inter-vehicle distance, whether or not the platoon is disturbed; a transmitter configured to transmit, in a case where the platoon is not disturbed, a common control instruction value to the plurality of vehicles; a communication apparatus that is provided in the vehicle and receives the control instruction value; and speed control unit for controlling the speed of the vehicle in accordance with the control instruction value.

In the above vehicle manufacturing system, the transmitter may transmit, in a case where the platoon is disturbed, individual control instruction values to the respective vehicles.

The above vehicle manufacturing system may further include address granting unit for granting, in a case where the platoon is not disturbed, a common address to the communication apparatus of each of the plurality of vehicles, and granting, in a case where the platoon is disturbed, individual addresses to the communication apparatuses of the plurality of respective vehicles.

In the above vehicle manufacturing system, the transmitter may transmit an individual control instruction value to the vehicle that has reached a predicted part where it is expected that the inter-vehicle distances will vary.

The above vehicle manufacturing system may include a camera configured to capture an image of any one of the vehicles in the platoon, in which the computation unit may compute the control instruction value based on a result of capturing the image in the camera.

In the above vehicle manufacturing system, the control instruction value may include a value indicating a speed or an acceleration of the vehicle.

A vehicle manufacturing method according to the present disclosure is a vehicle manufacturing method for performing control in such a way that a plurality of vehicles forming a platoon travel during a manufacturing process or a transporting process, the method including: computing a control instruction value for controlling a speed of the vehicle; detecting, based on a result of detection in a sensor, an inter-vehicle distance, which is a distance between one of the plurality of vehicles and another adjacent one of the plurality of vehicles; determining, based on the inter-vehicle distance, whether or not the platoon is disturbed; transmitting by a transmitter, when the platoon is not disturbed, a common control instruction value to the plurality of vehicles; receiving the control instruction value by a communication apparatus provided in the vehicle; and controlling the speed of the vehicle in accordance with the control instruction value.

In the aforementioned vehicle manufacturing method, the transmitter may transmit, in a case where the platoon is disturbed, individual control instruction values to the respective vehicles.

The aforementioned vehicle manufacturing method may further include address granting unit for granting, in a case where the platoon is not disturbed, a common address to the communication apparatus of each of the plurality of vehicles, and granting, in a case where the platoon is disturbed, individual addresses to the communication apparatuses of the plurality of respective vehicles.

In the aforementioned vehicle manufacturing method, the transmitter may transmit an individual control instruction value to the vehicle that has reached a predicted part where it is expected that the inter-vehicle distances will vary.

The aforementioned vehicle manufacturing method may include capturing, by a camera, an image of any one of the vehicles in the platoon; and computing the control instruction value based on a result of capturing the image in the camera.

In the aforementioned vehicle manufacturing method, the control instruction value may include a value indicating a speed or an acceleration of the vehicle.

A vehicle manufacturing system according to the present disclosure is a vehicle manufacturing system for performing control in such a way that a plurality of vehicles forming a platoon travel during a manufacturing process or a transporting process, the vehicle manufacturing system including: computation unit for computing individual control instruction values to the respective vehicles in order to control a speed of the vehicle; a transmitter configured to transmit the individual control instruction values to the respective vehicles; a communication apparatus that is provided in the vehicle and receives the control instruction value; and speed control unit for controlling the speed of the vehicle in accordance with the control instruction value; communication status determination unit for determining a communication status; and control switching unit for switching control of the computation unit and control of the transmitter in accordance with a result of determining the communication status in such a way that the computation unit computes a common control instruction value for the plurality of vehicles and the transmitter transmits the common control instruction value to the plurality of vehicles.

In the above vehicle manufacturing system, in a case where the communication status determination unit determines that the communication status is poor, the control switching unit may switch control of the computation unit and control of the transmitter in accordance with a result of determining the communication status in such a way that the computation unit computes a common control instruction value for the plurality of vehicles and the transmitter transmits the common control instruction value to the plurality of vehicles.

In the above vehicle manufacturing system, in a case where the communication status determination unit determines that the communication status is poor, the computation unit may compute the control instruction value so as to decrease the speed of the vehicle.

In the above vehicle manufacturing system, the transmitter may transmit an individual control instruction value to the vehicle that has reached a predicted part where it is expected that the inter-vehicle distances will vary.

A vehicle manufacturing method according to the present disclosure is a vehicle manufacturing method for performing control in such a way that a plurality of vehicles forming a platoon travel during a manufacturing process or a transporting process, the vehicle manufacturing method including: computing individual control instruction values to the respective vehicles to control at least one of a speed of the vehicle; transmitting, by a transmitter, the individual control instruction values to the respective vehicles; receiving the control instruction value by a communication apparatus provided in the vehicle; and controlling traveling of the vehicle in accordance with the control instruction value; determining a communication status; and switching control in accordance with a result of determining the communication status in such a way that a common control instruction value is computed for the plurality of vehicles and the common control instruction value is transmitted to the plurality of vehicles.

The aforementioned vehicle manufacturing method may include switching, in a case where it is determined that the communication status is poor, control in accordance with a result of determining the communication status in such a way that a common control instruction value is computed for the plurality of vehicles and the transmitter transmits the common control instruction value to the plurality of vehicles.

The aforementioned vehicle manufacturing method may include computing, in a case where it is determined that the communication status is poor, the control instruction value so as to decrease the speed of the vehicle.

In the aforementioned vehicle manufacturing method, the transmitter may transmit an individual control instruction value to the vehicle that has reached a predicted part where it is expected that the inter-vehicle distances will vary.

According to the present disclosure, it is possible to provide a vehicle manufacturing system and a vehicle manufacturing method capable of preventing a communication load and a processing load from increasing.

The above and other objects, features and advantages of the present disclosure will become more fully understood from the detailed description given hereinbelow and the accompanying drawings.

DESCRIPTION OF EMBODIMENTS

Embodiments of the present disclosure will now be described with reference to the drawings. However, the claimed disclosure is not limited to the following embodiments. Moreover, not all of the configurations described in the embodiments are essential as means for solving the problem. For the sake of clarity of the explanation, the following descriptions and drawings have been omitted and simplified as appropriate. In each drawing, the same elements have the same reference signs, and repeated descriptions have been omitted as appropriate.

First Embodiment

Vehicle Manufacturing System

Figure 1:
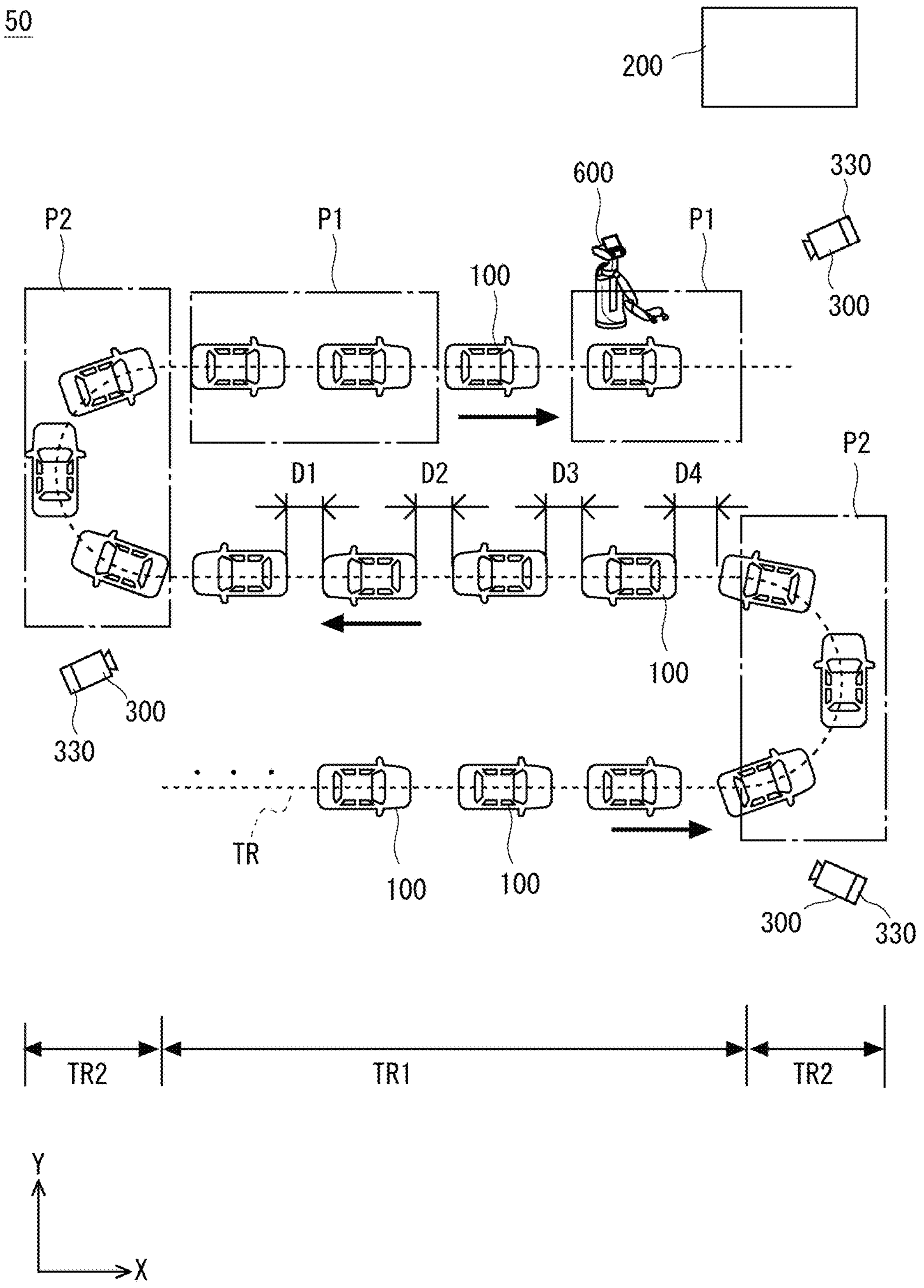
FIG. 1 is a schematic diagram showing a whole configuration of a vehicle manufacturing system according to a first embodiment.
Figure 2:
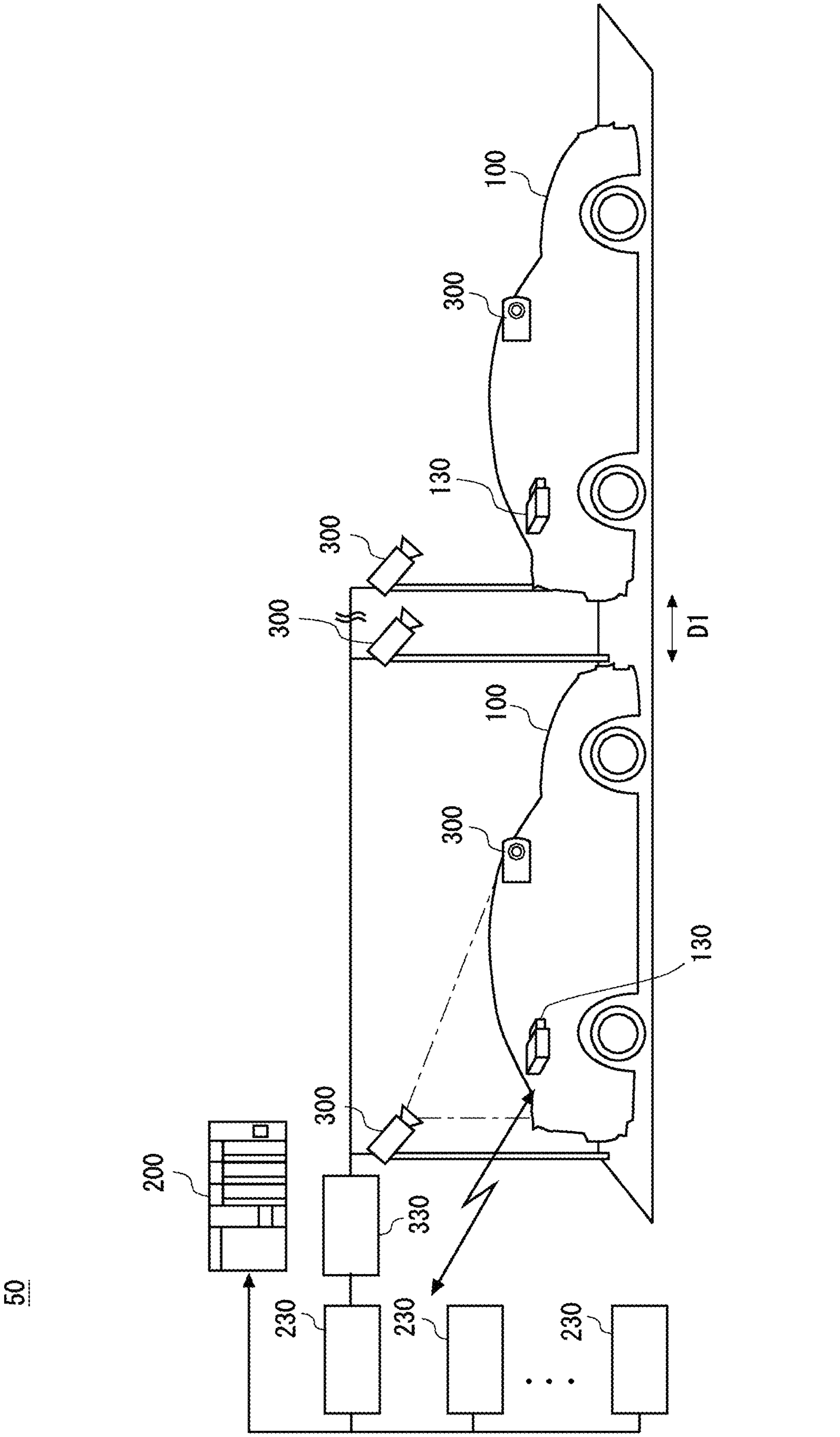
FIG. 2 is a schematic diagram showing a part of the vehicle manufacturing system.

With reference to FIGS. 1 and 2, a vehicle manufacturing system 50 according to this embodiment will be described. FIG. 1 is a schematic diagram showing a configuration of the vehicle manufacturing system 50. FIG. 2 is a diagram schematically showing two traveling vehicles 100. FIG. 1 shows an XY orthogonal coordinate system for the sake of clarity of the explanation.

The vehicle manufacturing system (this may also be referred to as the system) 50 is used in a vehicle manufacturing factory where vehicles 100 are manufactured. The vehicle manufacturing system 50 is also used in a transport location where a transporting process such as transportation to a yard or shipment is carried out. As shown in FIG. 1, the vehicle manufacturing system 50 includes a server 200, a sensor 300, and a robot 600. The plurality of vehicles 100 are self-driving vehicles that can travel by themselves during a manufacturing process. The vehicle manufacturing system 50 performs control in such a way that the plurality of vehicles 100 perform travel in a form of a platoon (i.e. a formation or an alignment).

The sensor 300 includes a communication apparatus 330 that transmits or receives data to or from the server 200. The server 200 includes a communication apparatus 230 that transmits or receives data to or from the sensor 300. Further, as shown in FIG. 2, the communication apparatus 230 has a function of transmitting or receiving data to or from the vehicle 100. Further, the vehicle 100 includes a communication apparatus 130 that receives data from the server 200. Each of the vehicles 100 includes the communication apparatus 130.

The communication apparatus 130, the communication apparatus 230, and the communication apparatus 330 may each be general-purpose equipment such as a network hub or a router apparatus. The communication apparatus 130, the communication apparatus 230, and the communication apparatus 330 each use, for example, general-purpose wireless communication such as WiFi (registered trademark). In each of the communication apparatus 130, the communication apparatus 230, and the communication apparatus 330, an address for specifying the communication partner is set. An address for communication is, for example, an Internet Protocol (IP) address.

Each of the vehicles 100 is a vehicle whose manufacturing has not yet been completed. As shown in FIG. 1, the vehicle 100 travels along a traveling path TR set in advance. The manufacturing of the vehicle 100 is gradually done as it travels along the traveling path TR. Specifically, while the vehicle 100 travels along the traveling path, workers (not shown), a robot 600, and the like perform assembling of parts, switch operations, welding, inspection, and so on. The work in each manufacturing process is thus performed. The work in each manufacturing process is performed in a predetermined order, whereby the vehicle 100 is manufactured.

A plurality of vehicles 100 travel in a form of a platoon. Specifically, the vehicles 100 travel at a constant speed in such a way that distances between vehicles are constant at a predetermined distance. Further, the plurality of vehicles 100 travel at the same speed. Further, the traveling path TR includes a straight-ahead area TR1 where a vehicle 100 travels straight ahead and a turning area TR2 where the vehicle 100 makes a turn. In the straight-ahead area TR1, the traveling path TR has a linear shape.

The turning area TR2 is a place where the vehicle 100 changes its traveling direction. In the turning area TR2, the vehicle 100 makes a U-turn. In the turning area TR2, for example, the traveling path TR has an arcuate shape having a predetermined radius of curvature. In the turning area TR2, the traveling path TR is a semicircle. The turning area TR2 is provided in each end of the straight-ahead area TR1. For example, after traveling through the straight-ahead area TR1 in the +X direction, the vehicle 100 reaches the turning area TR2. After the vehicle 100 makes a turn by 180 degrees in the turning area TR2, the vehicle 100 travels through the straight-ahead area TR1 in the −X direction. On the other hand, after the vehicle 100 travels through the straight-ahead area TR1 in the −X direction, the vehicle 100 reaches the turning area TR2. After the vehicle 100 makes a turn by 180 degrees in the turning area TR2, the vehicle 100 travels through the straight-ahead area TR1 in the +X direction. In this manner, the manufacturing of the vehicle 100 is gradually done as it alternately passes through the straight-ahead area TR1 and the turning area TR2.

Further, the turning area TR2 is a predicted part P2 where it is expected that inter-vehicle distances will vary. In a case where, for example, the vehicle 100 is controlled so as to decelerate at a time when the vehicle 100 makes a turn, inter-vehicle distances between this vehicle 100 and vehicles traveling before and after this vehicle 100 vary. Therefore, the turning area TR2 is a predicted part P2 where it is expected that inter-vehicle distances will vary.

Further, a predicted part P1 where it is expected that the inter-vehicle distances will vary is also set in a part of the straight-ahead area TR1 as well. The predicted part P1 is, for example, a part where a force in the front-back direction is applied due to the presence of a slope, STOP&GO assembly points, or a manufacturing process. The slope is, for example, an uphill or a downhill. In a slope, the vehicle 100 may be accelerated or decelerated due to the gravity. Accordingly, the slope is the predicted part PI where it is expected that inter-vehicle distances will vary.

The STOP&GO assembly points are points where the vehicle 100 temporarily stops. For example, in a case where the robot 600 performs welding or assembling, the vehicle 100 stops. More specifically, the vehicle 100 stops when it reaches an area where the robot 600 can move. Then, in the state in which the vehicle 100 stops, the robot 600 perform an assembling operation or a welding operation. Since the vehicle 100 temporarily stops, inter-vehicle distances vary. Accordingly, each of the STOP&GO assembly points is the predicted part PI where it is expected that the inter-vehicle distances will vary.

The parts where a force is applied in the front-back direction in the manufacturing process are, for example, working places where a worker presses elements against a vehicle from the front or rear direction to assemble these elements. When the worker pushes elements in the front-back direction to assemble these elements, the vehicle 100 is accelerated or decelerated. The predicted part P1 and the predicted part P2 are associated, for example, in map information of a factory stored in the server 200. For example, the server 200 stores map information in which coordinates indicating the predicted parts P1 and P2 are set. Control in the predicted parts P1 and P2 will be described later.

The sensor 300 is a camera that captures an image of the vehicle 100 which is moving or is stopped. The sensor 300 captures an image of one or a plurality of vehicles 100. The sensor 300 is provided to detect inter-vehicle distances. The server 200 is able to detect the position of the vehicle 100 in the factory based on the image captured by the sensor 300. The sensor 300 is installed, for example, on a wall surface, a support column, the ceiling or the like of the factory, and captures an image of the vehicle 100 from an oblique upward angle. The sensor 300 captures an image at an angle of view which includes two or more vehicles 100 that form a platoon. The sensor 300 may be installed at a height the same as that of the vehicles 100 and capture images of two or more vehicles 100 from a side direction thereof.

The communication apparatus 330 transmits the image captured by the sensor 300 to the server 200. The communication apparatus 330 may transmit, besides the captured image, information obtained from the captured image to the server 200. That is, the communication apparatus 330 transmits a result of detection detected in the sensor 300. Note that the communication apparatus 330 may be built in the sensor 300 or may be separated from the sensor 300. Further, the communication apparatus 330 may be shared among a plurality of sensors 300. That is, in a case where the plurality of sensors 300 are installed, one communication apparatus 330 may transmit data to the server 200.

As described above, after the sensor 300 captures an image of the vehicle 100, the communication apparatus 330 transmits the captured image and the like to the server 200. The communication apparatus 230 receives data of the captured image from the sensor 300. The server 200 performs predetermined image processing on the image captured by the sensor 300, whereby it is possible to specify inter-vehicle distances. For example, the server 200 calculates inter-vehicle distances D1-D4, etc. of a plurality of vehicles 100 forming a platoon. The number of vehicles forming a platoon is not particularly limited and may be any number that is equal to or greater than three.

Further, the sensor 300 for detecting inter-vehicle distances is not limited to a camera. A sensor for detecting inter-vehicle distances may be various kinds of sensors such as an RGB camera, a far-infrared camera, or a LiDAR. The sensor 300 is not limited to an optical sensor, and may instead be a radar. As a matter of course, two or more sensors 300 may be installed, or two or more sensors 300 may be used in combination with each other. For example, the sensor 300 may include a LiDAR and a camera.

The communication apparatus 330 transmits a result of the detection to the server 200. As described above, the result of the detection transmitted from the sensor 300 may be a captured image or may be information extracted from the image. In a case where, for example, the sensor 300 has an image processing function, the sensor 300 transmits information extracted by image processing to the server 200.

Further, as shown in FIG. 2, the sensor 300 may be mounted on the vehicle 100. The sensor 300 is, for example, an in-vehicle camera, a LiDAR, a radar, or the like. In a case where the sensor 300 is an in-vehicle camera, the sensor 300 captures an image of a vehicle 100 in front (this vehicle may be referred to as a front vehicle). In a case where the sensor 300 is an in-vehicle LiDAR, the sensor 300 measures a distance from the vehicle 100 to the front vehicle 100. The communication apparatus 130 transmits the image and a result of the measurement to the server 200.

The server 200 controls a vehicle 100 in such a way that the vehicle 100 moves along the traveling path TR. Further, the server 200 controls a plurality of vehicles 100 in such a way that the vehicles 100 perform platoon traveling. For example, the vehicles 100 travel along the traveling path TR in one line. The server 200 transmits a control signal to each vehicle 100 by the communication apparatus 230.

Figure 3:
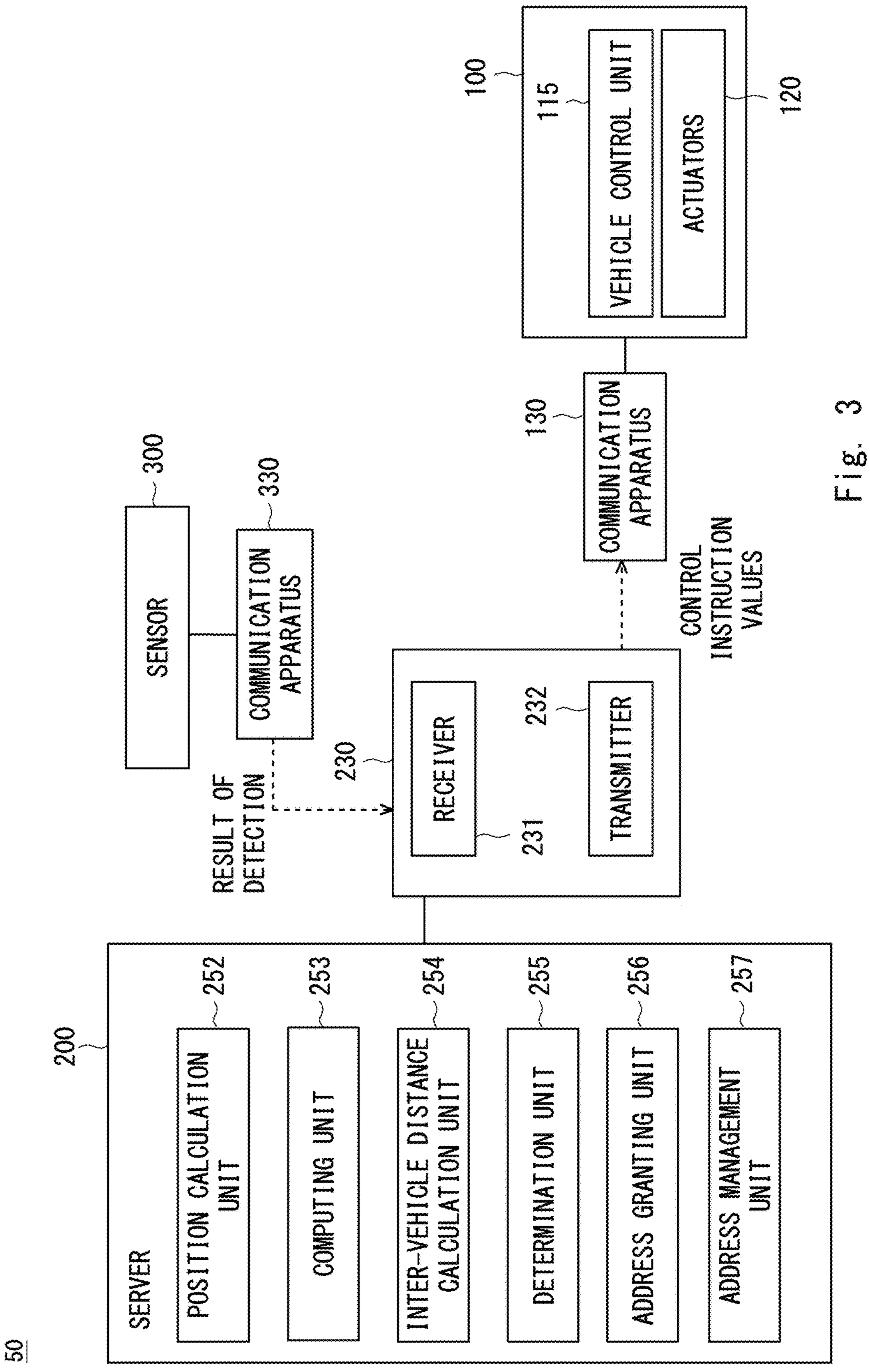
FIG. 3 is a block diagram showing a control system of the vehicle manufacturing system.

Hereinafter, with reference to FIG. 3, a control system of the vehicle manufacturing system 50 will be described. FIG. 3 is a block diagram showing the control system of the vehicle manufacturing system 50. FIG. 3 is a schematic diagram for describing communication processing in the vehicle manufacturing system 50. While a single vehicle 100 and a single sensor 300 are shown in FIG. 3, a plurality of vehicles 100 and a plurality of sensors 300 are actually provided, as shown in FIG. 1.

The server 200 includes the communication apparatus 230, a position calculation unit 252, a computing unit 253, an inter-vehicle distance calculation unit 254, a determination unit 255, an address granting unit 256, and an address management unit 257. The vehicle 100 includes a vehicle control unit 115, actuators 120, and the communication apparatus 130. The sensor 300 includes the communication apparatus 330. Note that the server 200 is not limited to a physically single apparatus and a plurality of servers 200 may instead be provided in a distributed manner. For example, a database and so on may be a storage device, a cloud server, or the like that is provided separately from the processor.

While a configuration in which the position calculation unit 252, the computing unit 253, the inter-vehicle distance calculation unit 254, the determination unit 255, the address granting unit 256, and the address management unit 257 are mounted on the server 200 will be described in the following description, the position calculation unit 252, the computing unit 253, the inter-vehicle distance calculation unit 254, or the determination unit 255 may instead be mounted on the sensor 300 or the vehicle 100. That is, the processing in the computing unit 253, the position calculation unit 252, the inter-vehicle distance calculation unit 254, and the determination unit 255 may be performed in the vehicle 100 or the sensor 300.

The position calculation unit 252 calculates position information indicating the position and the orientation of the vehicle based on the captured image. For example, the position calculation unit 252 may obtain XYZ global coordinates or an orientation in a map of the factory. The position calculation unit 252 specifies each of positions of vehicles 100 on the map indicated in the map information. At least a part of the processing in the position calculation unit 252 may be performed in the sensor 300. For example, the sensor 300 may include a processor or the like that performs image processing. In this case, position information indicating the position and the like of the vehicle 100 is transmitted from the communication apparatus 330 to the server 200.

The position of the vehicle 100 and the orientation of the vehicle 100 may be estimated using the captured image acquired by the sensor 300 provided in a place other than the place where the vehicle 100 is located. The position of the vehicle 100 can be acquired by calculating coordinates of measurement points of the mobile body in an image coordinate system by using, for example, the outline of the vehicle 100 detected from the captured image, and converting the calculated coordinates into coordinates in a global coordinate system. The orientation of the vehicle 100 can be estimated based on, for example, a direction of a moving vector of the mobile body calculated from changes in positions of feature points of the mobile body between frames of the captured image using an optical flow method. The orientation of the vehicle 100 may be calculated using, for example, a result of output of a yaw rate sensor or the like mounted on the vehicle 100.

The outline of the vehicle 100 included in the captured image can be detected, for example, by inputting the captured image to the detection model that uses artificial intelligence. The detection model may be, for example, a learned machine learning model learned so as to implement one of semantic segmentation or instance segmentation. This machine learning model may be, for example, convolutional neural network (hereinafter, CNN) learned by supervised learning using a learning dataset. The learning dataset includes, for example, a plurality of training images including the mobile body, and a ground-truth label indicating whether each area in the training image is an area indicating a mobile body or an area indicating a part other than the mobile body. When CNN learning is performed, parameters of the CNN are preferably updated in such a way that the error between the result of the output by the detection model and the ground-truth label is reduced by a back propagation method.

The computing unit 253 computes control instruction values for controlling the vehicle 100. The computing unit 253 calculates control instruction values based on the position of the vehicle 100. The computing unit 253 sends control instructions in such a way that the vehicle 100 moves along the traveling path TR. The control instruction values here may include a speed instruction value for controlling the speed of the vehicle and a steering angle instruction value for controlling a steering angle of the vehicle. The speed instruction value may be, for example, information indicating a speed, an acceleration, or the like of the vehicle 100. The steering angle instruction value is information indicating a steering angle or the like of the vehicle 100. The computing unit 253 generates control instruction values regarding the movement of the vehicle 100. In this manner, the computing unit 253 creates control instructions regarding the movement of the vehicle 100.

The communication apparatus 230 includes a receiver 231 and a transmitter 232. The receiver 231 receives various kinds of signals, data, or the like from the sensor 300 and the vehicle 100. The receiver 231 receives, for example, data indicating a result of detection by the sensor 300. Note that the data received from the sensor 300 may be image data or may be data extracted from the image data.

The transmitter 232 transmits various kinds of signals, data, or the like to the sensor 300 and the vehicle 100. The transmitter 232 transmits, for example, control instruction values to the vehicle 100. As a matter of course, the server 200 may transmit or receive data other than those stated above. As communication in the receiver 231 and the transmitter 232, processing according to a general-purpose communication standard such as WiFi (registered trademark) may be used.

The communication apparatus 130 of the vehicle 100 is wireless terminal equipment for enabling wireless communication with the server 200. An Internet Protocol (IP) address or the like is set in the communication apparatus 130. After the communication apparatus 130 of the vehicle 100 receives control instruction values, the vehicle 100 moves in accordance with the control instruction values. The actuators 120 include a wheel motor for driving wheels, a steering motor for controlling the steering angle, a brake for stopping the vehicle, and so on. The vehicle control unit 115 generates control signals to control the actuators 120 in accordance with a control instruction. The vehicle control unit 115 may be composed of an Electronic Control Unit (ECU). Accordingly, the vehicle 100 can move along the traveling path TR.

The address granting unit 256 grants an address for communication to each vehicle 100 and the communication apparatus 130 of this vehicle 100. For example, before the vehicle 100 starts traveling along the traveling path TR by itself, the address granting unit 256 grants an address to the communication apparatus 130. Alternatively, an address may be associated with an ID of the vehicle 100. Further, the address granting unit 256 grants an address to the communication apparatus 130 or the vehicle 100 in such a way that the traveling order and the address can be associated with each other. As will be described later, in a case where a platoon is not disturbed (i.e., not in disorder), the address granting unit 256 may grant a common address to the communication apparatus 130 of each of the plurality of vehicles. On the other hand, in a case where a platoon is disturbed (i.e., in disorder), the address granting unit 256 may grant individual addresses to the communication apparatuses 130 of the plurality of respective vehicles. The address granting unit 256 may grant the address before the start of production through self-propelled transportation or every time a control mode is switched.

The address management unit 257 manages addresses for communication in the entire factory. The address management unit 257 manages, for each address, whether it is being used or not being used. For example, the address management unit 257 includes a database for managing addresses. The address management unit 257 manages addresses of vehicles 100 which are carrying out self-propelled transportation as addresses that are being used. Then, for each of vehicles 100 that have already been manufactured, a flag indicating that the address is not being used is set. Accordingly, the addresses that are being used are changed to addresses that are not being used. The address management unit 257 may reuse the address that is no longer in use to control the next vehicle 100.

The inter-vehicle distance calculation unit 254 calculates inter-vehicle distances based on a result of detection by the sensor 300. For example, the inter-vehicle distance calculation unit 254 performs image processing on the image of the vehicle 100 captured by the sensor 300 to thereby calculate the inter-vehicle distances. The inter-vehicle distance calculation unit 254 may calculate the inter-vehicle distances based on position information. Alternatively, the inter-vehicle distance calculation unit 254 may calculate the inter-vehicle distances from a result of measurement by LiDAR or the like mounted on the vehicle 100.

The determination unit 255 determines whether or not the platoon is disturbed based on the inter-vehicle distances. For example, for each of the vehicles 100, inter-vehicle distances between each of the vehicles 100 and vehicles 100 in front and behind each of the vehicles 100 are calculated. The determination unit 255 determines whether or not the platoon is disturbed by comparing a plurality of inter-vehicle distances. For example, as shown in FIG. 1, the inter-vehicle distance calculation unit 254 calculates inter-vehicle distances D1-D3 between a plurality of vehicles 100 forming a platoon. The determination unit 255 detects whether or not the platoon is disturbed based on the calculated inter-vehicle distances D1-D3.

For example, a reference range indicating a reference distance is set in the determination unit 255. Then, in a case where each of the inter-vehicle distances D1-D3 is in the reference range, the determination unit 255 determines that the platoon is not disturbed. In a case where one of the inter-vehicle distances D1-D3 is outside the reference range, the determination unit 255 determines that the platoon is disturbed. Alternatively, the inter-vehicle distances D1-D3 are compared, and the determination unit 255 makes a determination based on a result of the comparison. For example, the determination unit 255 obtains a difference value of any two inter-vehicle distances. When the difference value is equal to or smaller than a predetermined value, the determination unit 255 determines that the platoon is not disturbed. In a case where the difference value has exceeded the predetermined value, the determination unit 255 determines that the platoon is disturbed.

The server 200 switches a group control and an individual control in a case where the server 200 transmits control instruction values to a plurality of vehicles 100. In the group control, the server 200 transmits a common control instruction value to two or more vehicles 100 forming a group. Specifically, the plurality of vehicles 100 forming a platoon in one line belong to one group. The server 200 transmits the same control instruction value to two or more vehicles 100 that belong to one group. In the individual control, individual control instruction values are transmitted to the respective vehicles 100.

After the communication apparatus 130 receives the control instruction value, the vehicle control unit 115 generates a control signal for controlling the actuators 120 in accordance with the control instruction value. For example, the vehicle control unit 115 controls a wheel motor or the like in such a way that the speed or the acceleration indicated by the control instruction value is achieved.

For example, the determination unit 255 determines that the platoon is not disturbed in the straight-ahead area TR1. In this case, the computing unit 253 creates a common control instruction value for the plurality of vehicles 100 in the platoon. In a case where a group control is performed, the computing unit 253 creates the same speed instruction value for a plurality of vehicles 100 aligned in one line. Then, the transmitter 232 transmits the common control instruction value to the plurality of vehicles 100. Therefore, the plurality of vehicles 100 that belong to one group can travel at the same speed.

Accordingly, it is possible to prevent the computing load and the communication load in the server 200 from increasing. For example, a control instruction value such as the speed or the acceleration is commonly used among a plurality of vehicles 100. Accordingly, in the server 200, it is not necessary to perform processing for obtaining the control instruction value for each of the vehicles 100. For example, the computing unit 253 obtains a control instruction value for the leading vehicle 100 in the platoon. Then, the transmitter 232 transmits this control instruction value to the leading vehicle 100 and the following vehicles 100 through multicast. The transmitter 232 is able to transmit the control instruction value to the plurality of vehicles 100 through multicast. Accordingly, it is possible to prevent the communication load from increasing.

Assume that the determination unit 255 determines that the platoon is disturbed in the straight-ahead area TR1. In this case, the computing unit 253 creates individual control instruction values for the plurality of respective vehicles 100. For example, the computing unit 253 creates different speed instruction values for the plurality of vehicles 100 as individual control. Then, the transmitter 232 transmits the individual control instruction values to the plurality of respective vehicles 100. Therefore, the plurality of vehicles 100 are able to travel at different speeds.

According to the above configuration, it is possible to resolve disturbance of the platoon. In a case where an inter-vehicle distance has become greater than a predetermined value, the determination unit 255 determines that the platoon is disturbed. Then, the computing unit 253 switches the group control to the individual control. For each vehicle 100 whose inter-vehicle distance from the front vehicle has become great, the computing unit 253 creates a control instruction value that makes the speed of this vehicle 100 higher than that of the front vehicle. That is, the computing unit 253 creates a control instruction value so as to accelerate the vehicle 100. The computing unit 253 computes, based on the inter-vehicle distance, control instruction values specific to the respective vehicles 100. The transmitter 232 transmits the control instruction values to the respective vehicles 100 through unicast. In this case, the following vehicle 100 approaches the front vehicle. Then, after the inter-vehicle distance has decreased to a predetermined value, the server 200 switches the individual control to the group control.

On the other hand, for each vehicle 100 whose inter-vehicle distance from the front vehicle has become small, the computing unit 253 creates a control instruction value that makes the speed of this vehicle 100 lower than that of the front vehicle. That is, the computing unit 253 creates a control instruction value so as to decelerate the vehicle 100. In this case, the following vehicle 100 is away from the front vehicle. Then, after the inter-vehicle distance has increased to a predetermined value, the server 200 switches the individual control to the group control. Accordingly, it is possible to prevent the inter-vehicle distance from varying. Note that the speed instruction value for controlling the speed may be a speed value or an acceleration value.

According to the above configuration, even in a case where a platoon is disturbed, it is possible to resolve disturbance of the platoon. That is, a plurality of vehicles 100 perform platoon traveling at predetermined intervals. Accordingly, it is possible to manufacture the vehicles 100 more safely and more efficiently, whereby productivity may be improved.

In the group control, the server 200 may manage a common address as addresses of the plurality of vehicles 100. It is assumed, for example, that an IP address is assigned to radio equipment of each of the vehicles 100 as a destination address. It is further assumed that the server 200 can rewrite the IP addresses. That is, the server 200 manages IP addresses in the factory on a database. Then, the server 200 manages whether each IP address is being used or unused.

In the group control, the address granting unit 256 grants a common IP address to the plurality of vehicles 100. The same IP address is assigned to the plurality of vehicles 100, whereby the server 200 is able to easily perform a group control of the plurality of vehicles 100. In the group control, the address granting unit 256 grants a common address to a plurality of vehicles 100 which belong to one group. The transmitter 232 transmits a common control instruction value to one IP address, which is a destination address.

In a case where the group control and the individual control are switched, the server 200 transmits a signal for rewriting the IP address to the vehicle 100. When the control is switched to the group control, the IP address is rewritten in such a way that the communication apparatuses 130 of the respective vehicles 100 have a common address. When the control is switched to the individual control, the IP address is rewritten in such a way that the communication apparatus 130 of the vehicle 100 have an individual address. Then, the communication apparatus 130 transmits, to the server 200, a signal indicating that the IP address has been rewritten. Upon receiving the signal from the communication apparatus 130, the server 200 rewrites the data in the database so as to manage the IP address.

In the predicted parts P1 and P2, the server 200 may switch the control mode to the individual control. The transmitter 232 may transmit individual control instruction values to respective vehicles 100 that have reached the predicted parts P1 and P2 where it is expected that the inter-vehicle distances will vary. At a timing when the vehicles 100 enter the predicted parts P1 and P2, the server 200 switches the group control to the individual control. In the predicted parts P1 and P2, the server 200 transmits the individual control instruction values to the respective vehicles 100. The vehicles 100 at the predicted parts P1 and P2 travel at their individual vehicle speeds. Therefore, each of the vehicles 100 may travel at an appropriate speed.

Further, at a timing when a vehicle 100 exits the predicted parts Pl and P2, the server 200 switches the individual control to the group control. Accordingly, the control mode of vehicles 100 other than those in the predicted parts Pl and P2 is switched to the group control. The server 200 transmits the common control instruction value to a plurality of vehicles 100 traveling in parts other than the predicted parts P1 and P2. Accordingly, it is possible to prevent the communication load from increasing.

While an example in which the control mode of controlling the speed instruction value regarding the speed is switched from the group control to the individual control has been described in the aforementioned description, a control mode of controlling the steering angle instruction value regarding the steering angle may instead be switched from the group control to the individual control. For example, in the straight-ahead area TR1, the server 200 transmits a common steering angle to a plurality of vehicles 100 which belong to one group as the steering angle instruction value.

Further, the sensor 300 may include a camera that captures an image of one of vehicles in a platoon. Accordingly, it is possible to appropriately detect each of the inter-vehicle distances D1-D3 of the plurality of vehicles 100. Then, the computing unit 253 computes a control instruction value based on a result of capturing images in a camera. For example, the computing unit 253 calculates, by image processing, the position of the vehicle 100 and the inter-vehicle distances. The computing unit 253 obtains a control instruction value for the leading vehicle 100. Then, in the group control, a common control instruction value is transmitted to the vehicles 100 in the group including the leading vehicle 100. Accordingly, it is possible to prevent the communication load from increasing and to cause the vehicles 100 in the platoon to travel with a high accuracy. As a matter of course, the vehicle 100 whose image is captured by the sensor 300 is not limited to the leading vehicle 100, and an image of the second vehicle 100 or the following vehicle 100 may instead be captured. Furthermore, the sensor 300 may capture images of two or more vehicles 100.

Figure 4:
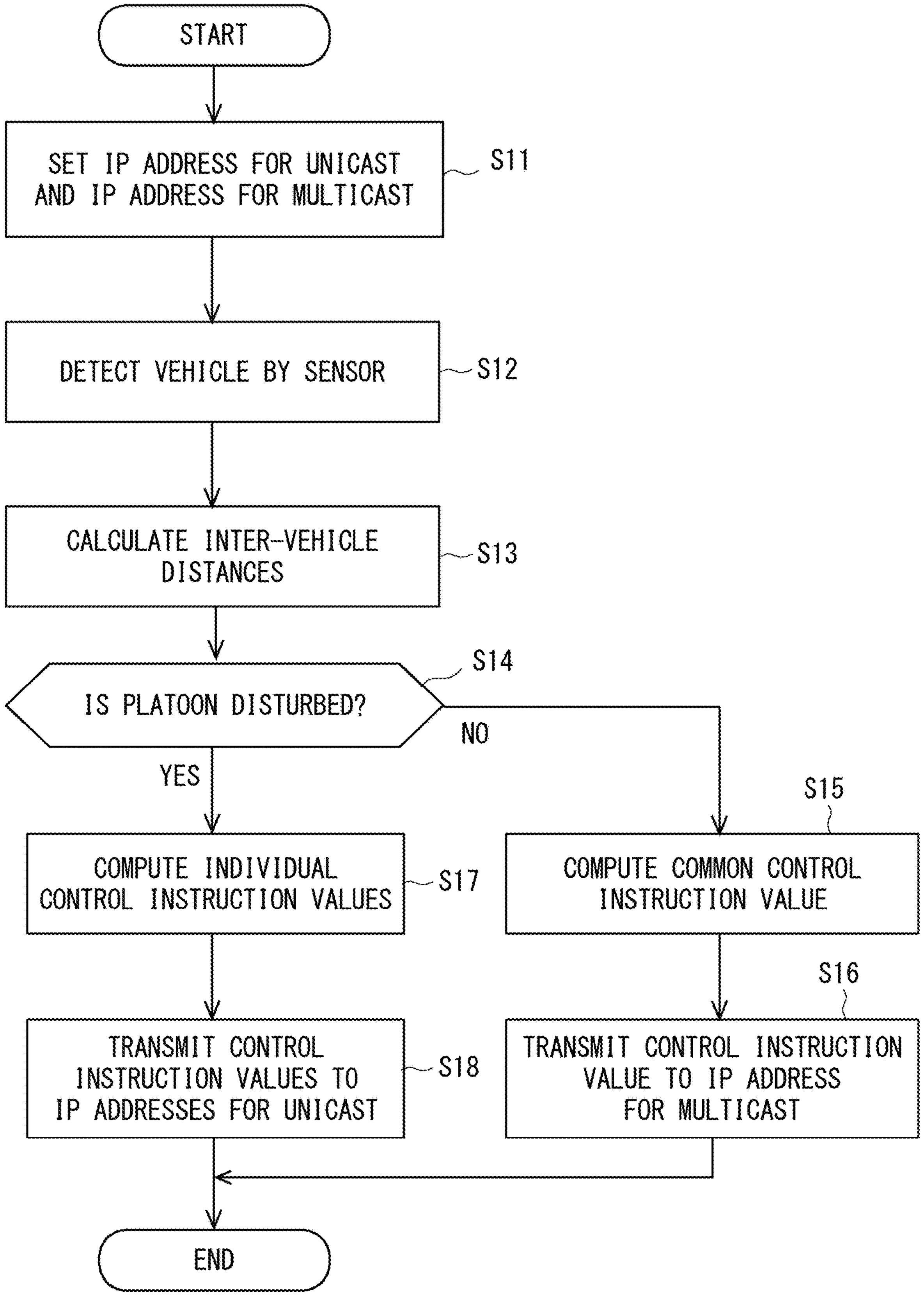
FIG. 4 is a flowchart showing a vehicle manufacturing method.

FIG. 4 is a flowchart showing a vehicle manufacturing method according to this embodiment. With reference to FIG. 4, the vehicle manufacturing method will be described. It is assumed, as described above, that a plurality of vehicles 100 forming a platoon are traveling along a traveling path TR. First, the server 200 sets in advance, for each of the vehicles 100, an IP address for unicast and an IP address for multicast (S11). Accordingly, two addresses are set in a communication apparatus 130 of one vehicle 100. The IP address for multicast is common among the plurality of vehicles 100. The IP address for unicast is individually set in each of the plurality of vehicles 100.

The sensor 300 detects a vehicle 100 (S12). In a case where the sensor 300 is a camera, the sensor 300 captures an image of the vehicle 100. Next, the inter-vehicle distance calculation unit 254 calculates inter-vehicle distances based on a result of detection by the sensor 300 (S13). In this example, the inter-vehicle distance calculation unit 254 performs image processing or the like to thereby calculate inter-vehicle distances between a plurality of vehicles 100 forming a platoon.

Next, the determination unit 255 determines, based on the inter-vehicle distances, whether or not the platoon is disturbed (S14). For example, the determination unit 255 determines whether or not the platoon is disturbed by comparing the inter-vehicle distances with a threshold. Alternatively, the determination unit 255 determines whether or not the platoon is disturbed by comparing one inter-vehicle distance with another inter-vehicle distance.

In a case where the platoon is not disturbed (NO in S14), the computing unit 253 computes a common control instruction value for the plurality of vehicles 100 (S15). For example, the computing unit 253 computes, based on the position of each vehicle 100 with respect to the traveling path TR, a control instruction value for the group control. The control instruction value includes an instruction value regarding the speed. Then, the transmitter 232 transmits the control instruction value to the IP address for multicast (S16). In this example, the transmitter 232 transmits the same control instruction value to the plurality of vehicles 100 all at the same time. The vehicle control unit 115 performs control in such a way that the plurality of vehicles 100 travel at the speed or the acceleration indicated by the common control instruction value.

In a case where the platoon is disturbed (YES in S14), the computing unit 253 computes individual control instruction values for a plurality of respective vehicles 100 (S17). For example, the computing unit 253 computes, based on the position of each of the vehicles 100 in the traveling path TR, control instruction values for individual control. Then, the transmitter 232 individually transmits the control instruction values to the IP addresses for unicast (S18). In this example, the transmitter 232 sequentially transmits different control instruction values to the plurality of respective vehicles 100. The vehicle control unit 115 performs control in such a way that the respective vehicles 100 travel at the speed or the acceleration indicated by the individual control instruction values.

As described above, in a case where the platoon is not disturbed, the server 200 transmits a common control instruction value to the plurality of vehicles 100. Accordingly, it is possible to prevent computing and communication loads from increasing. Further, in a case where the platoon is disturbed, the server 200 switches the group control to the individual control. Then, the computing unit 253 computes the individual control instruction values and transmits the individual control instruction values to the respective vehicles 100. Accordingly, it is possible to resolve disturbance of the platoon, whereby it is possible to perform stable control.

Further, in the predicted parts P1 and P2 where it is expected that the inter-vehicle distances will vary, the server 200 may switch the control mode of vehicles 100 to the individual control. For example, at a timing when vehicles 100 enter the predicted parts P1 and P2, the server 200 switches the control mode of these vehicles 100 to the individual control. That is, the server 200 excludes vehicles 100 at the predicted parts P1 and P2 from a group of the group control. In the predicted parts P1 and P2, it is predicted that there will be a disturbance in the inter-vehicle distance. Therefore, the server 200 switches the control mode of the vehicles to the individual control. Accordingly, it is possible to prevent the platoon from being disturbed in advance. Further, at a timing when vehicles 100 pass through the predicted parts P1 and P2, the control mode of these vehicles 100 may be switched to the group control again. At a timing when the vehicles 100 have passed through the predicted parts P1 and P2, the server 200 performs processing for allowing these vehicles 100 which have been subjected to individual control to be grouped again.

Second Embodiment

In a second embodiment, a vehicle manufacturing system 50 switches a control mode in accordance with a communication status. In a case where the communication status is good, the vehicle manufacturing system 50 performs an individual control. In a case where the communication status is not good, the vehicle manufacturing system 50 switches the control mode to a group control. Specifically, in a case where a communication band is tightened or a case where a communication speed is decreased, the vehicle manufacturing system 50 performs a group control in order to reduce a communication load. In a case where the communication band is not tightened or a case where the communication speed is not decreased, the vehicle manufacturing system 50 performs an individual control. In the individual control, a control instruction value for controlling a speed or a route (direction) of a vehicle is individually computed and transmitted. In the group control, a common control instruction value for controlling a speed or a route of the plurality of vehicles is computed and transmitted.

Figure 5:
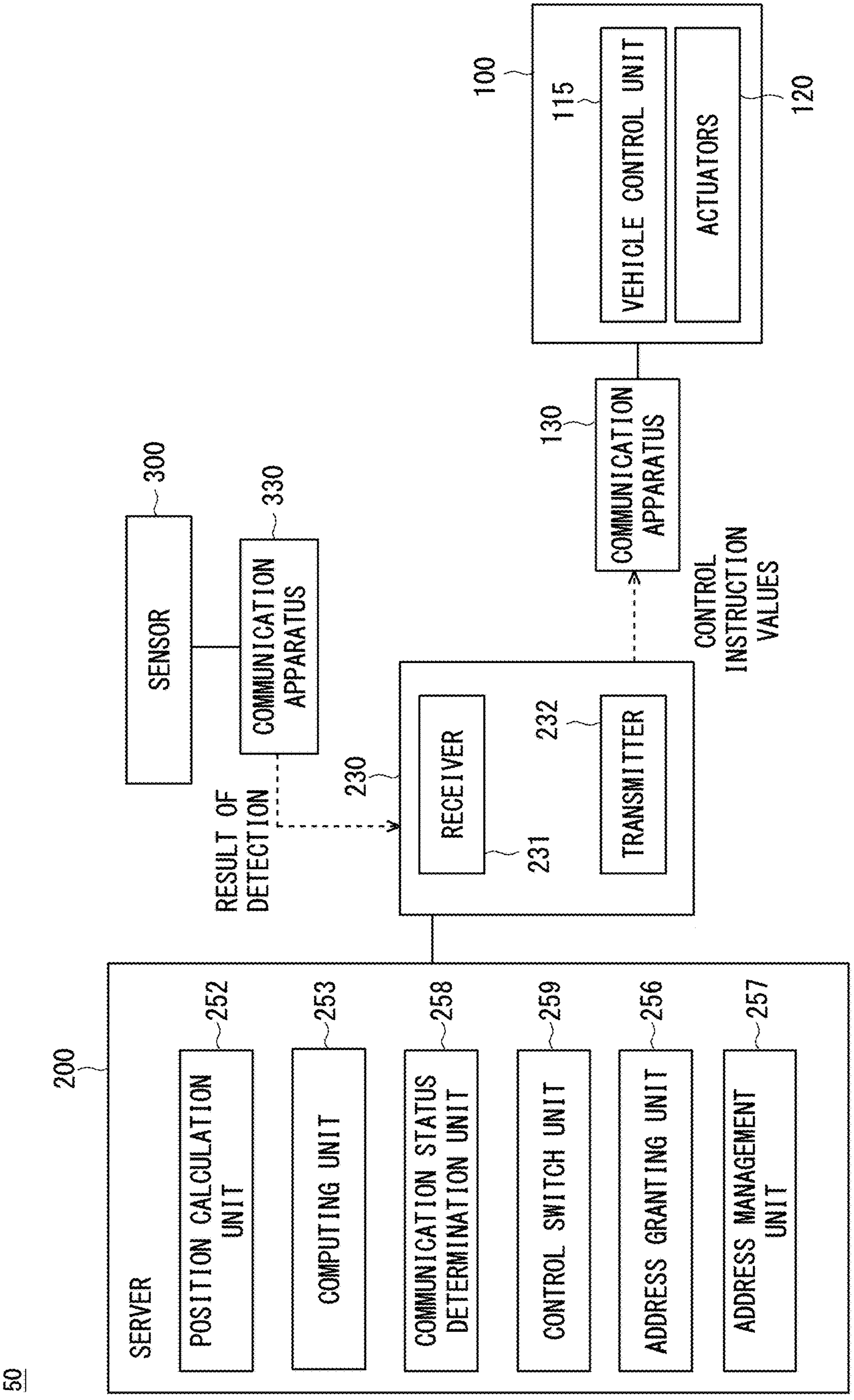
FIG. 5 is a block diagram showing a control system of a vehicle manufacturing system according to a second embodiment.

With reference to FIG. 5, a vehicle manufacturing system and a vehicle manufacturing method according to the second embodiment will be described. FIG. 5 is a block diagram showing a control system of the vehicle manufacturing system 50. Since the basic configuration of the vehicle manufacturing system 50 and a method for controlling the same are similar to those in the first embodiment, the description thereof will be omitted as appropriate. For example, the position calculation unit 252, the vehicle 100, the sensor 300, the computing unit 253, the address granting unit 256, the address management unit 257, and the like have configurations similar to those in the first embodiment.

The server 200 includes a communication status determination unit 258 and a control switch unit 259. That is, the communication status determination unit 258 and the control switch unit 259 are added to the server 200.

The communication status determination unit 258 determines the communication status in the system 50. The communication status determination unit 258 determines whether the communication status is good or poor in accordance with a communication speed in a manufacturing factory. The communication status determination unit 258 outputs a result of the determination to the control switch unit 259.

The control switch unit 259 switches the individual control and the group control in accordance with a result of determining the communication status. The control switch unit 259 switches control of the computing unit 253 and the control of the transmitter 232 in accordance with a result of determining the communication status. In a case where the communication status is good, the control switch unit 259 controls the computing unit 253 and the transmitter 232 in such a way that the individual control will be performed. The computing unit 253 computes individual control instruction values for the respective vehicles, and the transmitter 232 transmits the individual control instruction values. Accordingly, it is possible to individually control at least one of the speed or the route of the vehicle 100.

In a case where the communication status is poor, the control switch unit 259 switches the control mode to the group control. The computing unit 253 computes a common control instruction value to the plurality of vehicles 100. The communication apparatus 230 transmits the common control instruction value to the plurality of vehicles 100. Accordingly, it is possible to prevent the processing load and the communication load from increasing. Accordingly, a control instruction value of at least one of the speed or the route of the vehicle 100 becomes common among the plurality of vehicles 100.

In a case where the communication status is good, the control switch unit 259 switches the control mode to the individual control. The computing unit 253 computes individual control instruction values for the respective vehicles 100. The communication apparatus 230 transmits the individual control instructions to the respective vehicles 100. Accordingly, it is possible to move each of the vehicles 100 at different speeds or along different routes. Accordingly, it is possible to control traveling of the vehicles 100 with a higher accuracy and to perform control in accordance with the latest status of the vehicle manufacturing system 50.

Specifically, the communication status determination unit 258 measures a communication delay time (latency) or a radio wave strength and compares the measured value with a threshold. The communication status determination unit 258 then determines whether or not the communication status is good in accordance with a result of comparing the measured value with the threshold.

For example, the communication status determination unit 258 measures a communication response time using a ping command. In a case where the response time is longer than the threshold, that is, in a case where the latency is high, the communication status determination unit 258 determines that the communication status is poor. In a case where the response time is shorter than the threshold, that is, in a case where the latency is low, the communication status determination unit 258 determines that the communication status is good. In a case where the latency is low, the control switch unit 259 switches the control mode to the group control.

Alternatively, a communication channel occupancy rate is measured based on a radio wave strength of a radio communication signal. In a case where the channel occupancy rate is higher than a threshold, a communication band is tightened, in which case the control switch unit 259 switches the group control to the individual control. In a case where the channel occupancy rate is lower than the threshold, a communication band is not tightened, in which case the control switch unit 259 switches the control mode to the group control.

As described above, the control switch unit 259 switches the control of the position calculation unit 252 and the control of the transmitter 232 in accordance with a result of determining the communication status in such a way that individual control instruction values are computed for respective vehicles and transmitted to the respective vehicles. As a matter of course, data used to determine the communication status is not limited to a channel occupancy rate or a delay time. Further, the communication status determination unit 258 may determine the communication status based on two or more kinds of data.

If the number of vehicles 100 to be controlled increases, it is possible that the communication band may be tightened and the vehicles 100 may not be able to receive control instruction values at appropriate timings. In this case, the server 200 switches the control mode to the group control in order to prevent the communication load from increasing. That is, the server 200 computes a common control instruction value for a plurality of vehicles 100 and transmits the common control instruction value to the plurality of vehicles 100. Accordingly, it is possible to prevent the processing load and the communication load from increasing.

Further, the control switch unit 259 may control the computing unit 253 so as to switch the speed of the vehicle 100 in accordance with the communication status. For example, the control switch unit 259 switches the control mode so as to reduce the vehicle speed in a case where the communication status is poor. Therefore, the vehicle speed when the communication status is not good becomes lower than the vehicle speed when the communication status is good. In a case where the communication status is poor, the computing unit 253 computes the control instruction values in such a way that vehicles 100 included in the group of the group control can travel at a low speed. The vehicle speed of the vehicles 100 in the group control or the individual control may be determined in accordance with the inter-vehicle distances or the like.

Further, in the aforementioned description, in a case where the communication status is poor, the system 50 may change only the speed without switching the individual control to the group control. That is, in a case where it is determined that the communication status is poor, the system 50 may reduce the speed of each vehicle 100 by individual control instruction values.

In the group control, the server 200 cannot transmit control instruction values indicating vehicle speeds to the respective vehicles 100. Therefore, it is difficult to perform control to change the inter-vehicle distances. The server 200 performs control in such a way that the vehicle 100 moves at a low speed, whereby it is possible to increase the time for the vehicle 100 to travel the inter-vehicle distance (inter-vehicle time). That is, the inter-vehicle time can be secured, whereby it is possible to improve safety.

In a case where the group control is performed and a vehicle 100 reaches a place where it is expected that the platoon will be disturbed, the control mode of this vehicle 100 may be switched from the group control to the individual control. The processes in the first embodiment and the processes in the second embodiment may be performed in combination with each other. That is, the control switch unit 259 may switch the individual control and the group control based on one or both of the inter-vehicle distance and the communication status. Accordingly, the individual control and the group control can be switched at appropriate timings.

Figure 6:
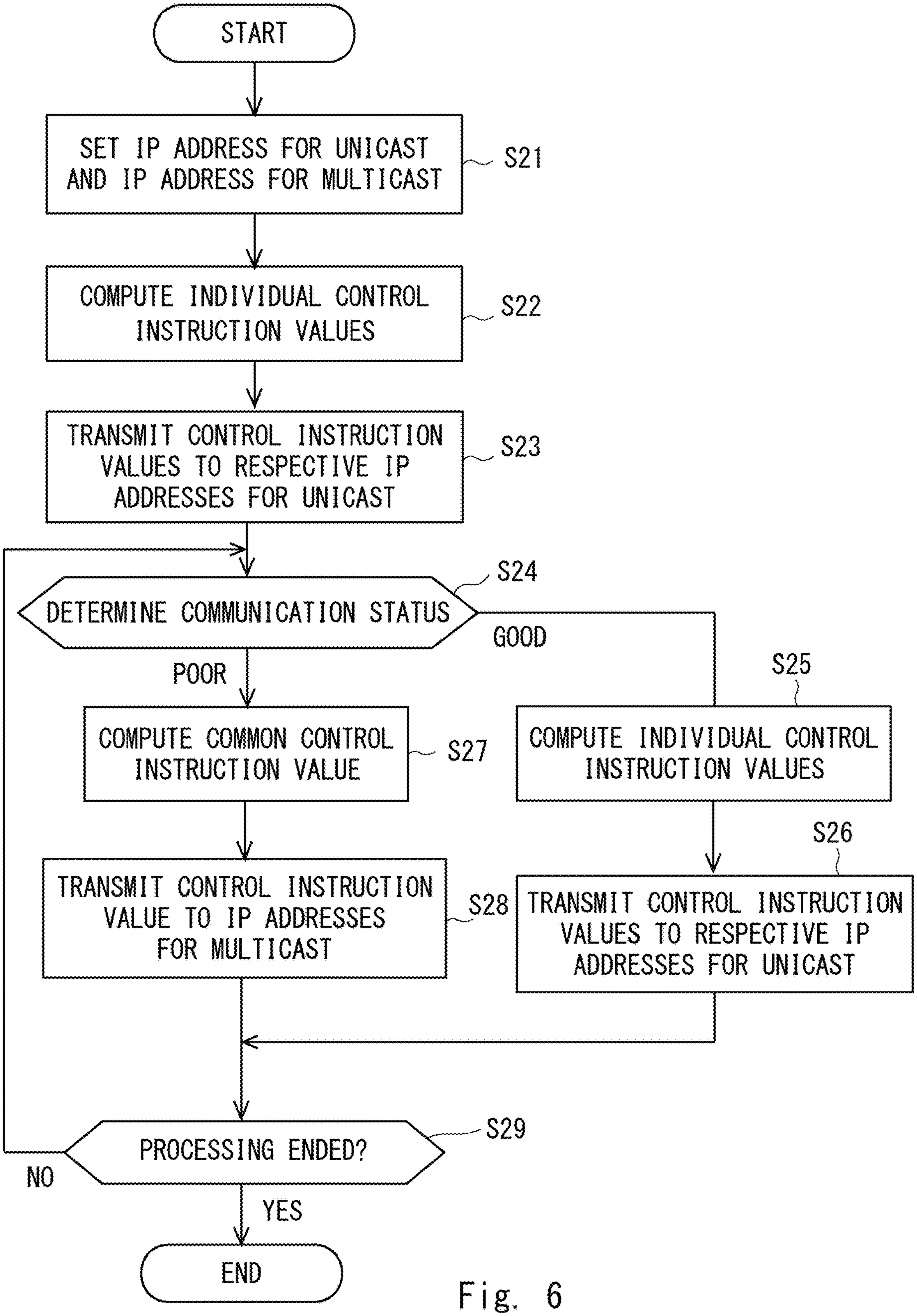
FIG. 6 is a flowchart showing a vehicle manufacturing method according to the second embodiment.

FIG. 6 is a flowchart showing a vehicle manufacturing method according to this embodiment. First, the server 200 sets an IP address for unicast and an IP address for multicast for each vehicle 100 in advance (S21). The computing unit 253 computes individual control instruction values for performing an individual control (S22). The transmitter 232 individually transmits the control instruction values to the respective IP addresses for unicast (S23). Since these processes are similar to Steps S11, S17, and S18 in FIG. 4, the detailed descriptions thereof will be omitted.

Next, the communication status determination unit 258 determines the communication status (S24). For example, the communication status determination unit 258 determines whether or not the communication status is good in accordance with a radio wave strength or a communication speed. As described above, the communication status determination unit 258 compares a channel occupancy rate or a delay time with a threshold to thereby determine whether or not the communication status is good.

In a case where the communication status is good ("good" in S24), the control switch unit 259 switches the control mode to an individual control, in which case the computing unit 253 computes individual control instruction values for a plurality of respective vehicles 100 (S25). Then the transmitter 232 individually transmits the control instruction values to the respective IP addresses for unicast (S26). Since the above processes are similar to Steps S17 and S18 in FIG. 4, the detailed descriptions will be omitted.

In a case where the communication status is not good ("poor" in S24), the control switch unit 259 switches the control mode to a group control, in which case the computing unit 253 computes a common control instruction value for the plurality of vehicles 100 (S27). The transmitter 232 transmits the control instruction value to the IP addresses for multicast (S28). Since these processes are similar to those in Steps S15 and S16 in FIG. 4, the detailed descriptions thereof will be omitted. Further, in Step S27, the position calculation unit 252 may obtain a control instruction value in such a way that the vehicle speed becomes lower than those indicated by the control instruction values computed in Steps S25 and S22.

The server 200 determines whether or not the processing has ended (S29). In a case where the processing has not ended (NO in S29), the process returns to Step S24, where the vehicle manufacturing system 50 repeats processing. In a case where the processing has ended (YES in S29), the vehicle manufacturing system 50 ends the processing.

As described above, in a case where the communication status has degraded, the control switch unit 259 switches the individual control to the group control. Accordingly, it is possible to reduce the communication load and suppress the communication delay of the control instruction values. In the first and second embodiments, the example in which vehicles that perform platoon traveling are controlled during a manufacturing process in a factory has been described. However, the above-described system and method may also be applied to control performed in a case where vehicles after being manufactured perform platoon traveling. For example, the above-described system and method may control vehicles 100 in a transporting process such as transportation to a yard or shipment.

Hereinafter, travel control examples for controlling traveling of the vehicle 100 in a system will be explained.

A. Travel Control Example 1

Figure 7:
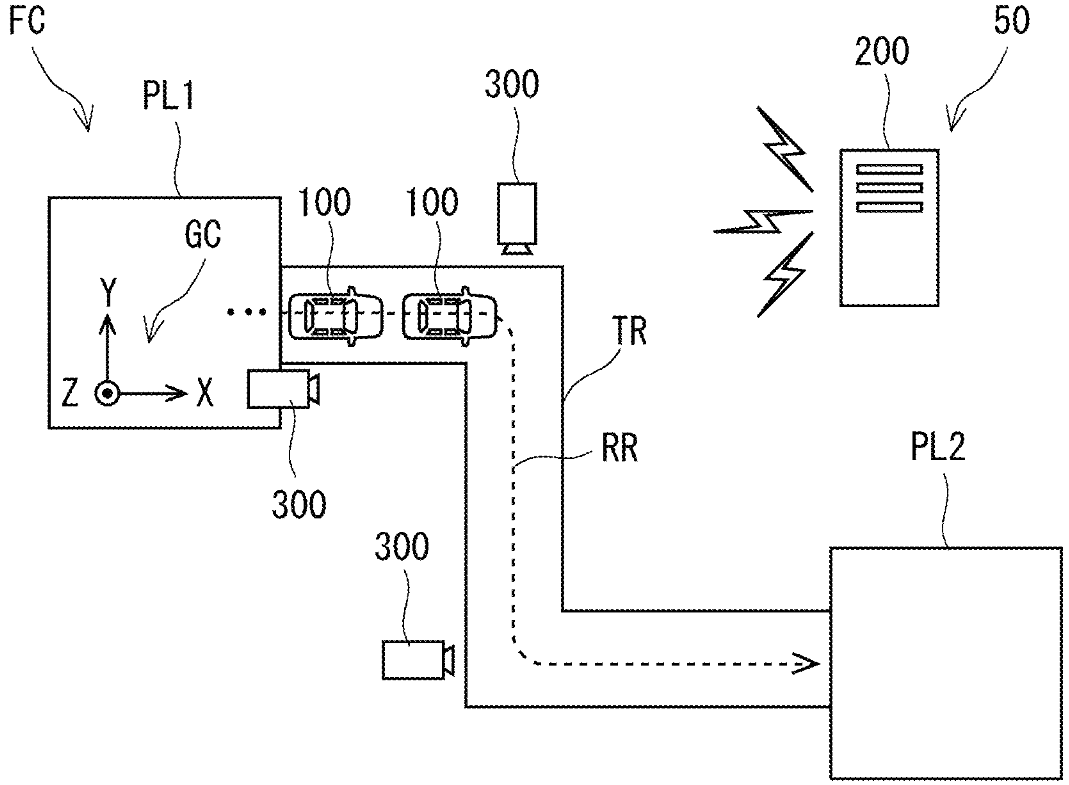
FIG. 7 is a diagram for describing travel control of a vehicle.

FIG. 7 is a conceptual diagram showing a configuration of a system 50 according to a travel control example 1. The system 50 includes a plurality of vehicles 100, each of which corresponds to a mobile body, a server 200, and one or more sensors 300.

Note that, when the mobile body is other than a vehicle, the terms "vehicle" and "car" in the present disclosure can be replaced by a "mobile body" as appropriate, and the term "travel" can be replaced by "move" as appropriate.

The vehicle 100 is configured to be able to travel by unmanned driving. The "unmanned driving" means driving not dependent on a driver's traveling operation. The traveling operation means an operation regarding at least one of "run", "turn", or "stop" of the vehicle 100. The unmanned driving is achieved by automatic or manual remote control that uses an apparatus located in the outside of the vehicle 100, or by autonomous control of the vehicle 100. Any passenger who does not perform the traveling operation may get on the vehicle 100 traveled by unmanned driving. The passenger who does not perform the traveling operation includes, for example, a person who is just sitting on a seat of the vehicle 100, and a person who is performing work such as an operation of assembling, an operation of inspection, or an operation of switches, which is an operation other than the traveling operation, while getting in the vehicle 100. Note that the driving by the traveling operation of the driver may be referred to as "manned driving".

The "remote control" here includes "complete remote control" in which all the operations of the vehicle 100 are completely determined from the outside of the vehicle 100 and "partial remote control" in which a part of the operations of the vehicle 100 is determined from the outside of the vehicle 100. Further, "autonomous control" includes "complete autonomous control" in which the vehicle 100 autonomously controls its own operation without receiving any piece of information from an external apparatus outside the vehicle 100 and "partial autonomous control" in which the vehicle 100 autonomously controls its own operation using information received from the external apparatus outside the vehicle 100.

In this embodiment, the system 50 is used in a factory FC which manufactures the vehicles 100. The reference coordinate system of the factory FC is a global coordinate system GC. That is, a desired position in the factory FC is expressed by coordinates of X, Y, and Z in the global coordinate system GC. The factory FC includes a first place PL1 and a second place PL2. The first place PL1 and the second place PL2 are connected to each other by a traveling path TR along which the vehicle 100 can travel. A plurality of sensors 300 are installed along the traveling path TR in the factory FC. The positions of the respective sensors 300 in the factory FC are adjusted in advance. The vehicle 100 moves from the first place PL1 to the second place PL2 along the traveling path TR by unmanned driving.

Figure 8:
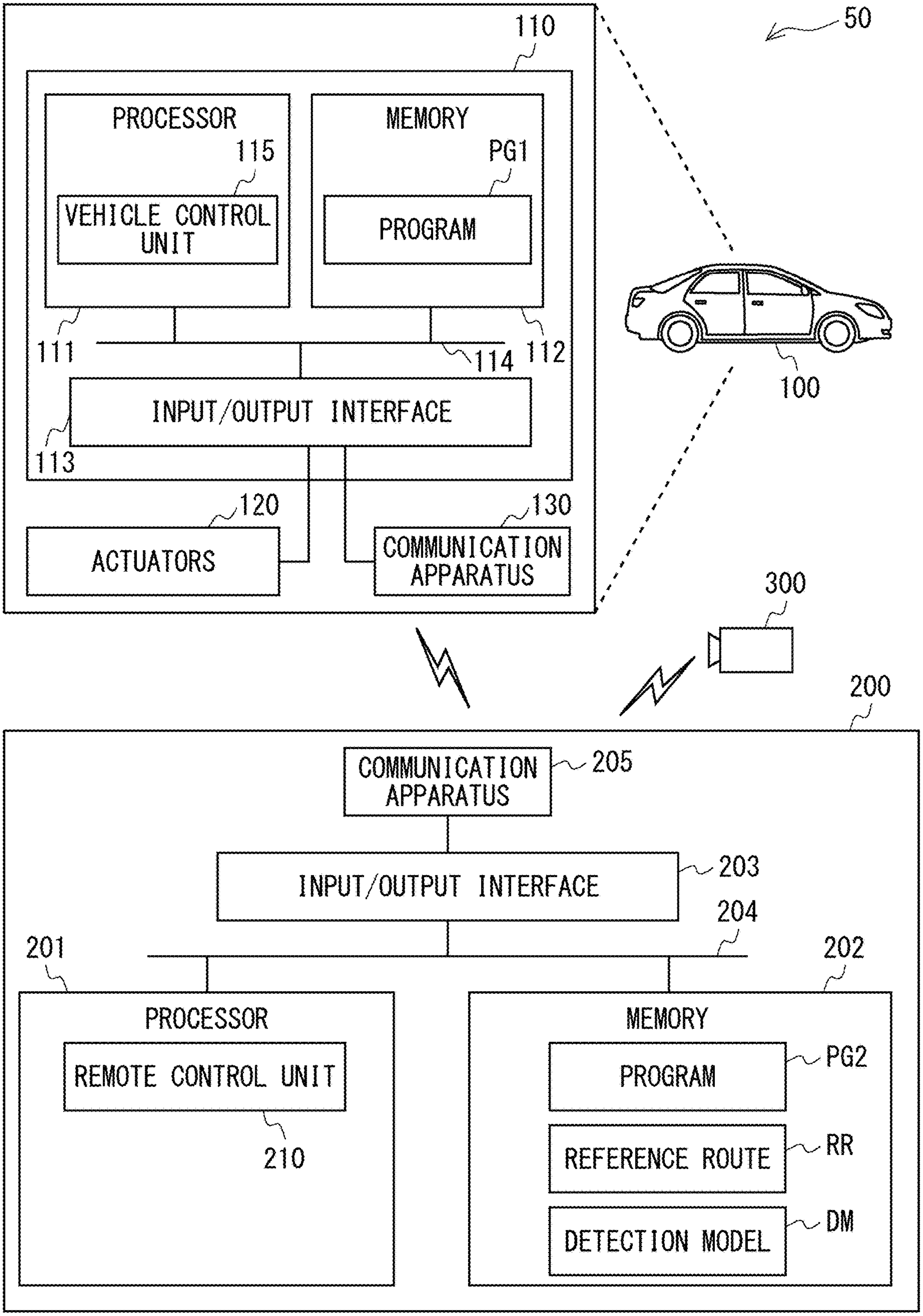
FIG. 8 is a control block diagram for describing a travel control example 1.

FIG. 8 is a block diagram showing a configuration of the system 50. The vehicle 100 includes a vehicle control apparatus 110 for controlling each part of the vehicle 100, actuators 120 including one or more actuators that drive under a control of the vehicle control apparatus 110, and a communication apparatus 130 for communicating with an external apparatus such as the server 200 by wireless communication. The actuators 120 include an actuator of a drive apparatus for accelerating the vehicle 100, an actuator of a steering apparatus for changing a traveling direction of the vehicle 100, and an actuator of a control apparatus for decelerating the vehicle 100.

The vehicle control apparatus 110 is composed of a computer including a processor 111, a memory 112, an input/output interface 113, and an internal bus 114. The processor 111, the memory 112, and the input/output interface 113 are connected to one another via the internal bus 114 in such a way that they can communicate with one another. The actuators 120 and the communication apparatus 130 are connected to the input/output interface 113. The processor 111 executes a program PG1 stored in the memory 112, thereby implementing various functions including a function as a vehicle control unit 115.

The vehicle control unit 115 causes the vehicle 100 to travel by controlling the actuators 120. The vehicle control unit 115 is able to cause the vehicle 100 to travel by controlling the actuators 120 using a travel control signal received from the server 200. The travel control signal is a control signal for traveling the vehicle 100. In this embodiment, the travel control signal includes an acceleration and a steering angle of the vehicle 100 as parameters. In another embodiment, the travel control signal may include, in place of or in addition to the acceleration of the vehicle 100, a speed of the vehicle 100 as a parameter.

The server 200 is composed of a computer including a processor 201, a memory 202, an input/output interface 203, and an internal bus 204. The processor 201, the memory 202, and the input/output interface 203 are connected to one another via the internal bus 204 in such a way that they can communicate with one another. A communication apparatus 205 for communicating with various kinds of apparatuses provided outside the server 200 is connected to the input/output interface 203. The communication apparatus 205 can communicate with the vehicle 100 by wireless communication and can communicate with each of the sensors 300 by wired communication or wireless communication. The processor 201 executes a program PG2 stored in the memory 202, thereby implementing various functions including the function as a remote control unit 210.

The remote control unit 210 acquires a result of detection by the sensors, generates a travel control signal for controlling the actuators 120 of the vehicle 100 using the result of the detection, and transmits the travel control signal to the vehicle 100, thereby causing the vehicle 100 to travel by remote control. The remote control unit 210 may generate not only the travel control signal but also, for example, control signals for controlling actuators for operating various kinds of auxiliary equipment provided in the vehicle 100 or various kinds of equipment such as a windshield wiper, power windows, or lamps. That is, the remote control unit 210 may operate these various kinds of equipment or various kinds of auxiliary equipment by remote control.

The sensor 300 is a sensor that is provided outside the vehicle 100. The sensor 300 according to this embodiment is a sensor that captures the vehicle 100 from the outside of the vehicle 100. The sensor 300 includes a communication apparatus (not shown) and can communicate with other apparatuses such as the server 200 and so on by wired communication or wireless communication.

Specifically, the sensor 300 is composed of a camera. The camera as the sensor 300 captures an image including the vehicle 100, and outputs the captured image as a result of detection.

Figure 9:
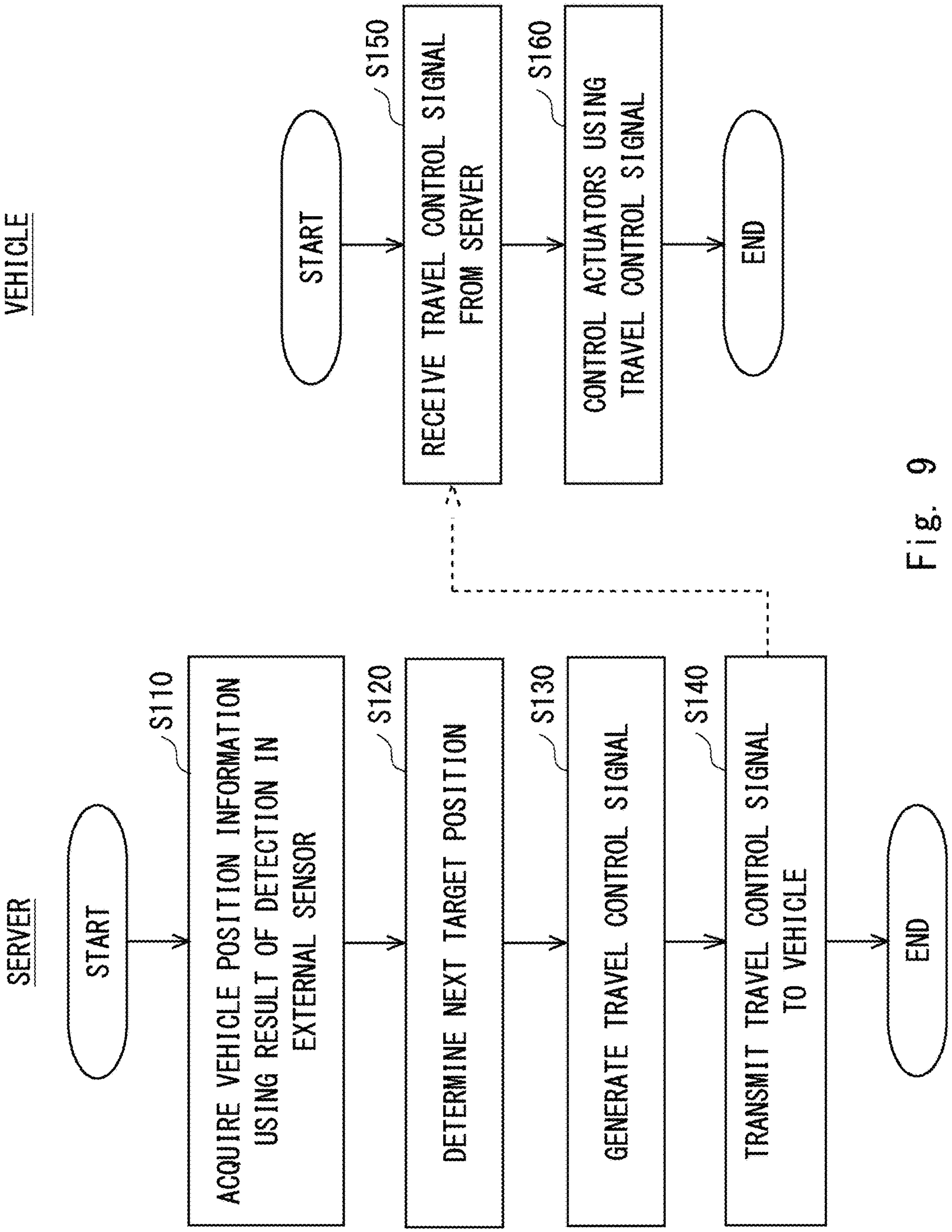
FIG. 9 is a flowchart for describing the travel control example 1.

FIG. 9 is a flowchart showing a processing procedure of travel control of the vehicle 100 according to the travel control example. In the processing procedure shown in FIG. 9, the processor 201 of the server 200 functions as the remote control unit 210 by executing the program PG2. Further, the processor 111 of the vehicle 100 functions as the vehicle control unit 115 by executing the program PG1.

In Step S110, the processor 201 of the server 200 acquires vehicle position information of the vehicle 100 using the result of the detection output from the sensor 300. The vehicle position information is position information that forms a basis for generating a travel control signal. In this embodiment, the vehicle position information includes the position and the orientation of the vehicle 100 in a global coordinate system GC of the factory FC. Specifically, in Step S110, the processor 201 acquires the vehicle position information using the captured image acquired from the camera, which is the sensor 300.

Specifically, in Step S110, the processor 201 detects, for example, the outline of the vehicle 100 from the captured image, calculates the coordinate system of the captured image, that is, coordinates of measurement points of the vehicle 100 in the local coordinate system, and converts the calculated coordinates into coordinates in a global coordinate system GC, thereby acquiring the position of the vehicle 100. The outline of the vehicle 100 included in the captured image can be detected, for example, by inputting the captured image to the detection model DM that uses artificial intelligence. The detection model DM is prepared, for example, in the system 50 or in the outside of the system 50 and is stored in the memory 202 of the server 200 in advance. The detection model DM may be, for example, a learned machine learning model learned so as to implement one of semantic segmentation or instance segmentation. This machine learning model may be, for example, convolutional neural network (hereinafter, CNN) learned by supervised learning using a learning dataset. The learning dataset includes, for example, a plurality of training images including the vehicle 100, and a label indicating whether each area in the training image is an area indicating the vehicle 100 or an area indicating a part other than the vehicle 100. When CNN learning is performed, parameters of the CNN are preferably updated in such a way that the error between the result of the output by the detection model DM and the label is reduced by a back propagation method. Further, the processor 201 is able to acquire the orientation of the vehicle 100 by estimating it based on the direction of the moving vector of the vehicle 100 calculated from changes in positions of feature points of the vehicle 100 between frames of the captured image using an optical flow method.

In Step S120, the processor 201 of the server 200 determines the target position that the vehicle 100 should go next. In this embodiment, the target position is expressed by coordinates of X, Y, and Z in a global coordinate system GC. The memory 202 of the server 200 stores a reference route RR, which is a route along which the vehicle 100 should travel, in advance. The route is expressed by a node indicating the departure place, nodes indicating passage points, a node that indicates the target position, and a link connecting the respective nodes. The processor 201 determines the target position that the vehicle 100 should go next using the vehicle position information and the reference route RR. The processor 201 determines the target position on the reference route RR which is ahead of the current position of the vehicle 100.

In Step S130, the processor 201 of the server 200 generates a travel control signal for traveling the vehicle 100 toward the determined target position. The processor 201 calculates the traveling speed of the vehicle 100 from the transition of the position of the vehicle 100 and compares the calculated traveling speed with the target speed. In general, when the traveling speed is lower than the target speed, the processor 201 determines the acceleration in such a way that the vehicle 100 accelerates. On the other hand, when the traveling speed is higher than the target speed, the processor 201 determines the acceleration in such a way that the vehicle 100 decelerates. Further, when the vehicle 100 is positioned on the reference route RR, the processor 201 determines the steering angle and the acceleration to prevent the vehicle 100 from being deviated from the reference route RR. On the other hand, when the vehicle 100 is not positioned on the reference route RR, that is, when the vehicle 100 is deviated from the reference route RR, the processor 201 determines the steering angle and the acceleration in such a way that the vehicle 100 returns onto the reference route RR.

In Step S140, the processor 201 of the server 200 transmits a generated travel control signal to the vehicle 100. The processor 201 repeats, in a predetermined cycle, acquisition of the position of the vehicle 100, determination of the target position, generation of the travel control signal, transmission of the travel control signal, and the like.

In Step S150, the processor 111 of the vehicle 100 receives the travel control signal transmitted from the server 200. In Step S160, the processor 111 of the vehicle 100 controls the actuators 120 using the received travel control signal, thereby causing the vehicle 100 to travel at an acceleration and a steering angle indicated in the travel control signal. The processor 111 repeats reception of the travel control signal, and control of the actuators 120 in a predetermined cycle. With the system 50 in this example, it is possible to cause the vehicle 100 to travel by remote control and to move the vehicle 100 without using transport equipment such as cranes or conveyors.

B: Travel Control Example 2

Figure 10:
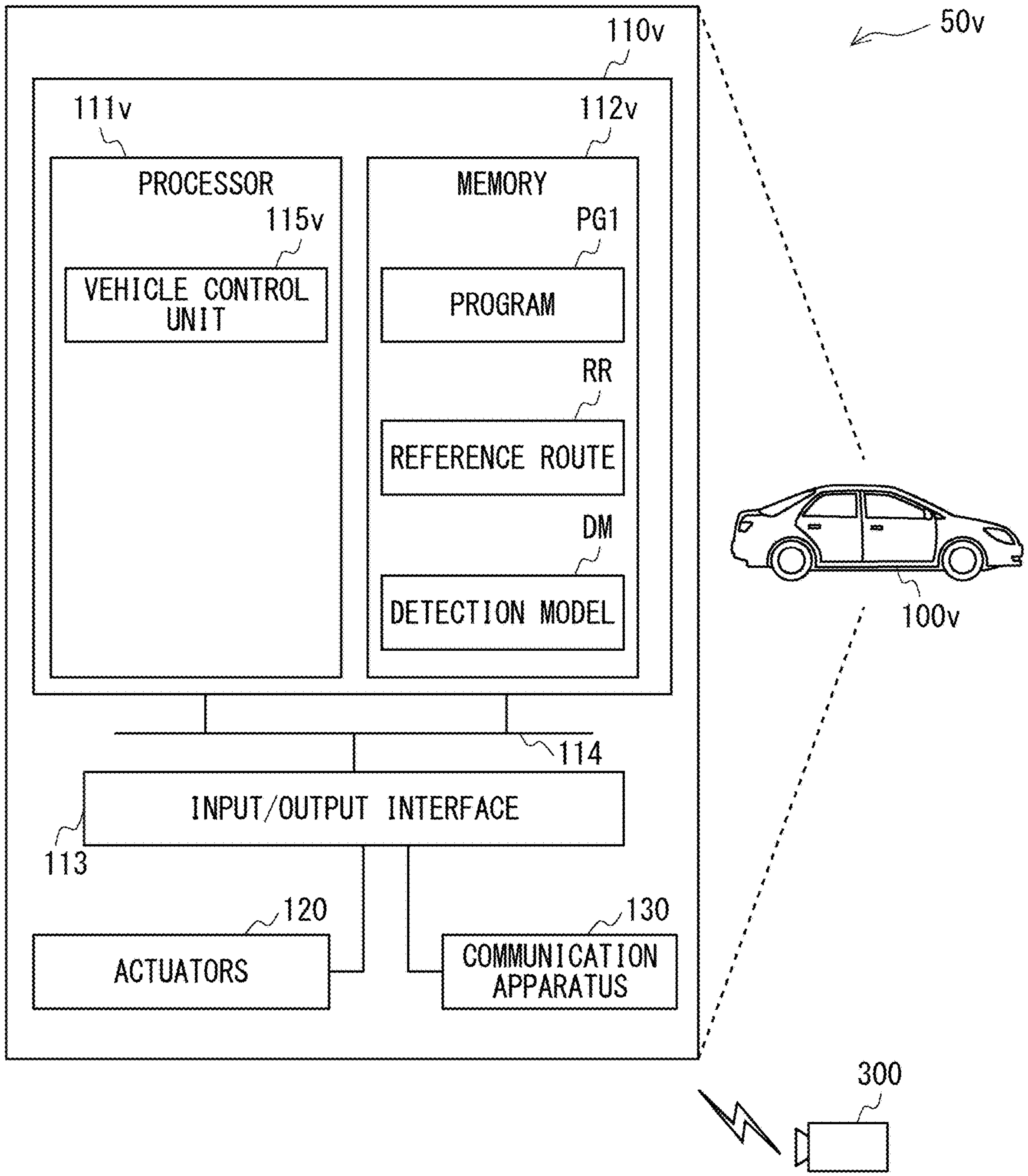
FIG. 10 is a control block diagram for describing a travel control example 2.

FIG. 10 is an explanatory diagram showing a schematic configuration of a system 50*v* according to a travel control example 2. In this example, the system 50*v* is different from that in the travel control example 1 in that the system 50*v* does not include the server 200. Further, a vehicle 100*v* in this configuration can travel by autonomous control of the vehicle 100*v*. The other configurations are the same as those stated above unless otherwise specified.

In this example, a processor 111*v* of a vehicle control apparatus 110*v* functions as a vehicle control unit 115*v* by executing a program PG1 stored in a memory 112*v*. The vehicle control unit 115*v* acquires a result of output by a sensor, generates a travel control signal using the result of the output, and outputs the generated travel control signal to operate the actuators 120, thereby enabling the vehicle 100*v* to travel by autonomous control. In this example, the memory 112*v* stores, besides the program PG1, a detection model DM and a reference route RR in advance.

Figure 11:
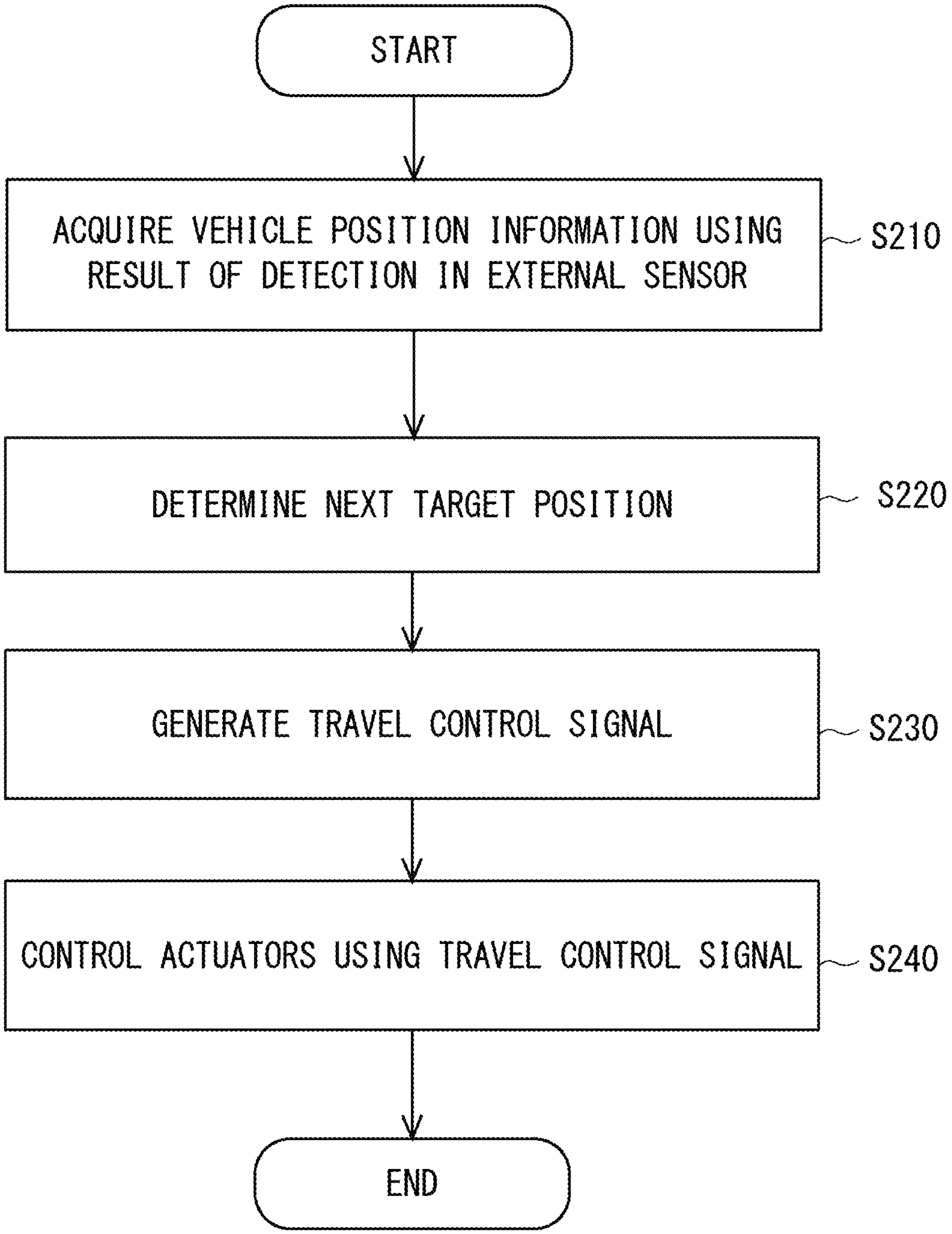
FIG. 11 is a flowchart for describing the travel control example 2.

FIG. 11 is a flowchart showing a processing procedure of a travel control of the vehicle 100*v* in Travel control Example 2. In the processing procedure shown in FIG. 11, the processor 111*v* of the vehicle 100*v* functions as the vehicle control unit 115*v* by executing the program PG1.

In Step S210, the processor 111*v* of the vehicle control apparatus 110*v* acquires vehicle position information using a result of detection output from a camera, which is the sensor 300. In Step S220, the processor 111*v* determines the target position that the vehicle 100*v* should go next. In Step S230, the processor 111*v* generates a travel control signal for causing the vehicle 100*v* to travel toward the determined target position. In Step S240, the processor 111*v* controls the actuators 120 using the generated travel control signal, thereby causing the vehicle 100*v* to travel according to a parameter indicated in the travel control signal. The processor 111*v* repeats acquisition of the vehicle position information, determination of the target position, generation of the travel control signal, and control of the actuators in a predetermined cycle. With the system 50*v* in this example, it is possible to cause the vehicle 100*v* to travel by autonomous control of the vehicle 100*v* without remotely controlling the vehicle 100*v* by the server 200.

YY: Other Travel Control Examples (YY1) In the above examples, the sensor 300 is a camera. On the other hand, the sensor 300 may not be a camera, and may instead be, for example, Light Detection And Ranging (LiDAR). In this case, the result of the detection output from the sensor 300 may be three dimensional point cloud data indicating the vehicle 100. In this case, the server 200 and the vehicle 100 may acquire the vehicle position information by template matching that uses three dimensional point cloud data indicating the result of the detection and reference point cloud data that is prepared in advance.

(YY2) In the travel control example 1, the server 200 executes processing from the acquisition of the vehicle position information to the generation of the travel control signal. On the other hand, the vehicle 100 may perform at least a part of the processing from the acquisition of the vehicle position information to the generation of the travel control signal. For example, the following forms from (1) to (3) may be employed.

(1) The server 200 may acquire vehicle position information, determine the target position that the vehicle 100 should go next, and generate a route from the current position of the vehicle 100 indicated in the acquired vehicle position information to the target position. The server 200 may generate a route to a target position which is between the current position and the target position or may generate a route to the target position. The server 200 may transmit the generated route to the vehicle 100. The vehicle 100 may generate the travel control signal in such a way that the vehicle 100 travels along the route received from the server 200 and control the actuators 120 using the generated travel control signal.

(2) The server 200 may acquire vehicle position information and transmit the acquired vehicle position information to the vehicle 100. The vehicle 100 may determine the target position that the vehicle 100 should go next, generate a route from the current position of the vehicle 100 indicated in the received vehicle position information to the target position, generate a travel control signal in such a way that the vehicle 100 travels along the generated route, and control the actuators 120 using the generated travel control signal.

(3) In the forms of the above (1) and (2), an internal sensor may be mounted on the vehicle 100, and a result of detection output from the internal sensor may be used in at least one of the generation of the route or the generation of the travel control signal. The internal sensor is a sensor mounted on the vehicle 100. The internal sensor may include, for example, a sensor that detects a motion state of the vehicle 100, a sensor that detects an operation state of each part of the vehicle 100, and a sensor that detects an environment near the vehicle 100. Specifically, the internal sensor may include, for example, a camera, LiDAR, a millimeter wave radar, an ultrasonic sensor, a GPS sensor, an acceleration sensor, a gyro sensor or the like. For example, in the form of the above (1), the server 200 may acquire the result of the detection in the internal sensor and reflect the result of the detection in the internal sensor in the route when the route is generated. In the form of the above (1), the vehicle 100 may acquire the result of the detection in the internal sensor and reflect the result of the detection in the internal sensor in a travel control signal when the travel control signal is generated. In the form of the above (2), the vehicle 100 may acquire the result of the detection in the internal sensor, and reflect the result of the detection in the internal sensor in the route when the route is generated. In the form of the above (2), the vehicle 100 may acquire the result of the detection in the internal sensor, and reflect the result of the detection in the internal sensor in the travel control signal when the travel control signal is generated.

(YY3) In the travel control example 2, an internal sensor may be mounted on the vehicle **100*v* and the result of the detection output from the internal sensor may be used in at least one of the generation of the route or the generation of the travel control signal. For example, the vehicle 100*v* may acquire the result of the detection in the internal sensor, and reflect the result of the detection in the internal sensor in the route when the route is generated. The vehicle 100*v*** may acquire the result of the detection in the internal sensor and reflect the result of the detection in the internal sensor in the travel control signal when the travel control signal is generated.

(YY4) In the travel control example 2, the vehicle **100*v* acquires the vehicle position information using the result of the detection by the sensor 300. On the other hand, an internal sensor is mounted on the vehicle 100*v*, and the vehicle 100*v* may acquire vehicle position information using a result of detection in the internal sensor, determine the target position that the vehicle 100*v* should go next, generate a route from the current position of the vehicle 100*v* indicated in the acquired vehicle position information to the target position, generate a travel control signal for traveling along the generated route, and control the actuators 120 using the generated travel control signal. In this case, the vehicle 100*v* may travel without using the result of the detection by the sensor 300. Note that the vehicle 100*v* may acquire a target arrival time or congestion information from the outside of the vehicle 100*v* and reflect the target arrival time or the congestion information in at least one of the route or the travel control signal. Further, all the functional configurations of the system 50*v* may be provided in the vehicle 100*v*. That is, the processing implemented by the system 50*v* in the present disclosure may be achieved by the vehicle 100*v* alone. For example, a leading vehicle 100*v* may transmit control instruction values to the following vehicle 100**.

(YY5) In the travel control example 1, the server 200 automatically generates a travel control signal to be transmitted to the vehicle 100. On the other hand, the server 200 may generate the travel control signal to be transmitted to the vehicle 100 in accordance with an operation performed by an external operator located in the outside of the vehicle 100. For example, the external operator may operate a manipulation apparatus including a display for displaying a captured image output from the sensor 300, a steering, an accelerator pedal, and a brake pedal for remotely operating the vehicle 100, and a communication apparatus for communicating with the server 200 by wired communication or wireless communication, and the server 200 may generate a travel control signal in accordance with the operation added to the manipulation apparatus.

(YY6) In each of the above travel control examples, it is sufficient that the vehicle 100 include a configuration capable of moving by unmanned driving, and the vehicle 100 may have, for example, a form of a platform including the configurations stated below. Specifically, it is sufficient that the vehicle 100 at least include the vehicle control apparatus 110 and the actuators 120 in order to exert three functions of "run", "turn", and "stop" by unmanned driving. In a case where the vehicle 100 externally acquires information for unmanned driving, the vehicle 100 may further include a communication apparatus 130. That is, the vehicle 100 that can move by unmanned driving may not be provided with at least some of internal components such as a driving seat or a dashboard, at least some of the external components such as a bumper or a fender, or a body shell. In this case, before the vehicle 100 is shipped from the factory FC, the other components such as a body shell may be mounted on the vehicle 100, or the other components such as the body shell may be mounted on the vehicle 100 after the vehicle 100 is shipped from the factory FC in a state in which the other components such as the body shell are not mounted on the vehicle 100. Each of the components may be mounted thereon from a desired direction such as an upper side, a lower side, a front side, a rear side, a right side, or a left side of the vehicle 100, mounted thereon from the same direction, or mounted thereon from different directions. In terms of the form of the platform, the position may be determined as in the vehicle 100 according to the first embodiment.

(YY7) The vehicle 100 may be manufactured by combining a plurality of modules. The module means a unit formed of a plurality of components grouped according to a part or a function of the vehicle 100. For example, the platform of the vehicle 100 may be manufactured by combining a front module that forms a front part of the platform, a central module that forms a central part of the platform, and a rear module that forms a rear part of the platform with one another. Note that the number of modules that form the platform is not limited to three, and may be two or smaller or four or larger. Further, in addition to or in place of the components that form the platform, components of the vehicle 100 that form parts other than the platform may be formed in modules. Further, these modules may include any exterior components such as a bumper or a grill or any interior components such as seats and a console. Further, not only the vehicle 100 but also any form of mobile body may be manufactured by combining a plurality of modules. These modules may be manufactured, for example, by joining a plurality of components by welding, fixtures, or the like, or may be manufactured by integrally molding at least some of the components that form the module as one component by casting. A molding method of integrally forming one component, in particular, a relatively large-sized component is also called gigacasting or megacasting. For example, the above front module, central module, and rear module may be manufactured using gigacasting.

(YY8) Transporting a vehicle 100 using traveling of the vehicle 100 by unmanned driving is also referred to as "self-propelled transportation". Further, a configuration for achieving self-propelled transportation is referred to as a "vehicle remote control autonomous travel transportation system". Further, a production method for producing vehicles 100 using self-propelled transportation is also referred to as "self-propelled production". In the self-propelled production, for example, in a factory FC that manufactures the vehicles 100, a part of the transportation of the vehicle 100 is achieved by self-propelled transportation.

(YY9) In each of the above travel control examples, some or all of the functions and processing implemented in the form of software may be implemented in the form of hardware. Further, some or all of the functions and processing implemented in the form of hardware may be implemented in the form of software. For example, various types of circuits such as an integrated circuit or a discrete circuit may be used as hardware for implementing various types of functions in each of the above embodiments.

Further, some or all of the processing performed in the vehicle 100, the server 200, the sensor 300, the robot 600, and so on described above may be implemented as a computer program.

A (The) program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A vehicle manufacturing system for performing control in such a way that a plurality of vehicles forming a platoon travel during a manufacturing process or a transporting process, the vehicle manufacturing system comprising:

a computation unit for computing a control instruction value for controlling a speed of the vehicle;

a sensor provided to detect an inter-vehicle distance, which is a distance between one of the plurality of vehicles and another adjacent one of the plurality of vehicles;

a determination unit for determining, based on the inter-vehicle distance, whether or not a platoon is disturbed;

a transmitter configured to transmit, in a case where the platoon is not disturbed, a common control instruction value to the plurality of vehicles;

a communication apparatus that is provided in the vehicle and receives the control instruction value;

speed control unit for controlling the speed of the vehicle in accordance with the control instruction value;

an address granting unit configured to grant, in the case where the platoon is not disturbed, a common address to the communication apparatus of each of the plurality of vehicles. and grant, in a case where the platoon is disturbed, individual addresses to the communication apparatuses of the plurality of vehicles; and an address management unit for managing whether each address is used or unused, wherein the common address is an IP address for multicast and is common among the plurality of vehicles, wherein the individual addresses are IP addresses for unicast and are individually set in each of the plurality of vehicles, wherein the transmitter transmits, in the case where the platoon is disturbed, individual control instruction values to the individual address through the unicast, wherein the transmitter transmits, in the case where the platoon is not disturbed. common control instruction values to the common address through the multicast, and wherein the control instruction value comprises a value indicating the speed or an acceleration of the vehicle.

2. The vehicle manufacturing system according to claim 1, wherein the transmitter transmits an individual control instruction value to the vehicle that has reached a predicted part where it is expected that the inter-vehicle distances will vary.

3. The vehicle manufacturing system according to claim 1, comprising a camera configured to capture an image of any one of the vehicles in the platoon, wherein the computation unit computes the control instruction value based on a result of capturing the image in the camera.

4. A vehicle manufacturing method for performing control in such a way that a plurality of vehicles forming a platoon travel during a manufacturing process or a transporting process, the method comprising:

computing a control instruction value for controlling a speed of the vehicle;

detecting, based on a result of detection in a sensor, an inter-vehicle distance, which is a distance between one of the plurality of vehicles and another adjacent one of the plurality of vehicles;

determining, based on the inter-vehicle distance, whether or not a platoon is disturbed;

transmitting by a transmitter, when the platoon is not disturbed, a common control instruction value to the plurality of vehicles;

receiving the control instruction value by a communication apparatus provided in the vehicle;

controlling the speed of the vehicle in accordance with the control instruction value;

granting, in a case where the platoon is not disturbed, a common address to the communication apparatus of each of the plurality of vehicles, and granting, in a case where the platoon is disturbed, individual addresses to the communication apparatuses of the plurality of vehicles; and managing whether each address is used or unused, wherein the common address is an IP address for multicast and is common among the plurality of vehicles, wherein the individual addresses are IP addresses for unicast and are individually set in each of the plurality of vehicles, wherein the transmitter transmits, in the case where the platoon is disturbed, individual control instruction values to the individual address through the unicast, wherein the transmitter transmits, in the case where the platoon is not disturbed, the common control instruction value to the common address through the multicast, and wherein the control instruction value comprises a value indicating the speed or an acceleration of the vehicle.

5. The vehicle manufacturing method according to claim 4, wherein the transmitter transmits an individual control instruction value to the vehicle that has reached a predicted part where it is expected that the inter-vehicle distance will vary.

6. The vehicle manufacturing method according to claim 4, comprising:

capturing, by a camera, an image of any one of the vehicles in the platoon; and computing the control instruction value based on a result of capturing the image in the camera.

7. A vehicle manufacturing system for performing control in such a way that a plurality of vehicles forming a platoon travel during a manufacturing process or a transporting process, the vehicle manufacturing system comprising:

a computation unit for computing individual control instruction values to the respective vehicles in order to control at least one of a speed or a route of the vehicle;

a transmitter configured to transmit the individual control instruction values to the respective vehicles;

a communication apparatus that is provided in the vehicle and receives the control instruction value; and a control unit for controlling traveling of the vehicle in accordance with the control instruction value;

a communication status determination unit for determining a communication status;

a control switching unit for switching control of the computation unit and control of the transmitter in accordance with a result of determining the communication status in such a way that the computation unit computes a common control instruction value for the plurality of vehicles and the transmitter transmits the common control instruction value to the plurality of vehicles, an address granting unit configured to grant, in a case where a platoon is not disturbed, a common address to the communication apparatus of each of the plurality of vehicles, and grant, in a case where the platoon is disturbed, individual addresses to the communication apparatuses of the plurality of vehicles; and an address management unit for managing whether each address is used or unused;

wherein the common address is an IP address for multicast and is common among the plurality of vehicles, wherein the individual addresses are IP addresses for unicast and are individually set in each of the plurality of vehicles, wherein the transmitter transmits, in the case where the platoon is disturbed, the individual control instruction values to the individual address through the unicast, wherein the transmitter transmits, in the case where the platoon is not disturbed, the common control instruction value to the common address through the multicast.

8. The vehicle manufacturing system according to claim 7, wherein the communication status determination unit is configured to determine whether the communication status is poor, wherein the communication status is determined as poor based on at least one of a communication delay time being greater than a first threshold or a channel occupancy rate being higher than a second threshold, based on the communication status being determined as poor, the control switching unit is configured to switch control of the computation unit and control of the transmitter in accordance with the result of determining the communication status in such a way that the computation unit computes the common control instruction value for the plurality of vehicles and the transmitter transmits the common control instruction value to the plurality of vehicles.

9. The vehicle manufacturing system according to claim 7, wherein the communication status determination unit is configured to determine whether the communication status is poor, wherein the communication status is determined as poor based on at least one of a communication delay time being greater than a first threshold or a channel occupancy rate being greater than a second threshold, based on the communication status being determined as poor, the computation unit is configured to compute the control instruction value so as to decrease the speed of the vehicle.

10. The vehicle manufacturing system according to claim 7, wherein the transmitter transmits an individual control instruction value to the vehicle that has reached a predicted part where it is expected that an inter-vehicle distance will vary.

11. The vehicle manufacturing system according to claim 2, wherein the predicted part is a turning area where the vehicle makes turn, or an area where a force in front-back direction is applied to the vehicle.

12. The vehicle manufacturing method according to claim 5, wherein the predicted part is a turning area where the vehicle makes turn, or an area where a force in front-back direction is applied to the vehicle.

13. The vehicle manufacturing system according to claim 10, wherein the predicted part is a turning area where the vehicle makes turn, or an area where a force in front-back direction is applied to the vehicle.

* * * * *